United States Patent
Tateiwa et al.

(10) Patent No.: US 11,055,582 B2
(45) Date of Patent: Jul. 6, 2021

(54) OBJECT RECOGNITION DEVICE AND OBJECT RECOGNITION METHOD

(71) Applicants: Mitsubishi Electric Corporation, Tokyo (JP); MAZDA MOTOR CORPORATION, Hiroshima (JP)

(72) Inventors: Shinichi Tateiwa, Tokyo (JP); Koji Iida, Tokyo (JP); Takayuki Moritani, Hiroshima (JP)

(73) Assignees: Mitsubishi Electric Corporation, Tokyo (JP); MAZDA MOTOR CORPORATION, Hiroshima (JP)

( * ) Notice: Subject to any disclaimer, the term of this patent is extended or adjusted under 35 U.S.C. 154(b) by 62 days.

(21) Appl. No.: 16/681,294

(22) Filed: Nov. 12, 2019

(65) Prior Publication Data

US 2020/0184283 A1    Jun. 11, 2020

(30) Foreign Application Priority Data

Dec. 10, 2018 (JP) .............................. JP2018-230491

(51) Int. Cl.
    *G06K 9/62* (2006.01)
(52) U.S. Cl.
    CPC ....... *G06K 9/6288* (2013.01); *G06K 2209/21* (2013.01)
(58) Field of Classification Search
    CPC .......................... G06K 9/6288; G06K 2209/21
    See application file for complete search history.

(56) References Cited

U.S. PATENT DOCUMENTS

| | | | | |
|---|---|---|---|---|
| 2009/0043504 | A1* | 2/2009 | Bandyopadhyay | G01S 19/48 701/469 |
| 2010/0208063 | A1* | 8/2010 | Lee | G06K 9/00771 348/143 |
| 2017/0008521 | A1* | 1/2017 | Braunstein | G06K 9/00791 |
| 2017/0184403 | A1* | 6/2017 | Kumabe | G01S 19/49 |
| 2018/0340782 | A1* | 11/2018 | Tseng | G05D 1/021 |
| 2019/0094883 | A1* | 3/2019 | Lee | G01C 21/30 |
| 2019/0236955 | A1* | 8/2019 | Hu | G08G 1/096844 |
| 2020/0139967 | A1* | 5/2020 | Beller | B60W 30/18159 |
| 2021/0019627 | A1* | 1/2021 | Zhang | G06K 9/00718 |
| 2021/0061275 | A1* | 3/2021 | Takahama | G06F 17/17 |

FOREIGN PATENT DOCUMENTS

JP          6194520 B1       9/2017

* cited by examiner

*Primary Examiner* — David F Dunphy
(74) *Attorney, Agent, or Firm* — Sughrue Mion, PLLC; Richard C. Turner

(57) ABSTRACT

Provided is an object recognition device capable of preventing a change of fusion data from a previous value to a current value that exceeds a tolerable range. The object recognition device is configured to execute specialized tracking processing when a change of the fusion data from the previous value to the current value exceeds a tolerable range, and generate tracking data that is equivalent to prediction data in the specialized tracking processing by setting an adjustment physical quantity for solving a fusion data discontinuity state.

11 Claims, 11 Drawing Sheets

OBJECT RECOGNITION DEVICE AND OBJECT RECOGNITION METHOD

BACKGROUND OF THE INVENTION

1. Field of the Invention

The present invention relates to an object recognition device and an object recognition method.

2. Description of the Related Art

An object recognition device of the related art (see Japanese Patent No. 6194520, for example) is installed in a vehicle, and is configured to recognize an object in the surroundings of its own vehicle by processing observation data that is received from a plurality of sensors configured to detect information about an object as observation data.

Autonomous driving systems and other vehicle control systems are given as an application example of the object recognition device described above. A vehicle control system is configured to perform various forms of vehicle control such as automatic braking and adaptive cruise control by using the result of object recognition performed by the object recognition device.

Now, there is considered an object recognition device configured to generate data about a physical quantity indicating the state of an object in the surroundings of a vehicle, namely, fusion data, by the Kalman filter technique or other known tracking methods with the use of observation data received from a plurality of sensors.

In the object recognition device described above, a change in the number of sensors associated with a piece of fusion data that is associated with one object may cause a problem in that a change of the fusion data from the previous value to the current value exceeds a tolerable range. This may lead to unnatural object movement recognized by the object recognition device, and consequently to a failure in accurate recognition of the object.

SUMMARY OF THE INVENTION

The present invention has been made to solve the problem described above, and an object of the present invention is therefore to provide an object recognition device and an object recognition method with which a change of fusion data from the previous value to the current value that exceeds a tolerable range is prevented from occurring.

According to at least one embodiment of the present invention, there is provided an object recognition device, which is configured to generate fusion data from observation data that is received from each of a plurality of sensors to output the fusion data, each of the plurality of sensors being configured to detect, as the observation data, a physical quantity that indicates a state of an object present in a detectable range, the object recognition device including: a data reception unit configured to receive the observation data from each of the plurality of sensors; a prediction processing unit configured to generate prediction data that is a result of predicting a current value of the fusion data by using a previous value of the fusion data and in accordance with a specific movement model to output the prediction data; and a tracking processing unit configured to execute specialized tracking processing when a change of the fusion data from the previous value to the current value exceeds a tolerable range, the tracking processing unit being configured to generate, in the specialized tracking processing, tracking data that is equivalent to the prediction data by setting an adjustment physical quantity for solving a state in which a change of the fusion data from the previous value to the current value exceeds the tolerable range.

According to at least one embodiment of the present invention, there is provided an object recognition method for generating fusion data from observation data that is received from each of a plurality of sensors to output the fusion data, each of the plurality of sensors being configured to detect, as the observation data, a physical quantity that indicates a state of an object present in a detectable range, the object recognition method including: receiving the observation data from each of the plurality of sensors; generating prediction data that is a result of predicting a current value of the fusion data by using a previous value of the fusion data and in accordance with a specific movement model to output the prediction data; and executing specialized tracking processing when a change of the fusion data from the previous value to the current value exceeds a tolerable range, the executing specialized tracking processing including generating, in the specialized tracking processing, tracking data that is equivalent to the prediction data by setting an adjustment physical quantity for solving a state in which a change of the fusion data from the previous value to the current value exceeds the tolerable range.

According to at least one embodiment of the present invention, it is possible to provide the object recognition device and the object recognition method with which a change of fusion data from the previous value to the current value that exceeds the tolerable range is prevented from occurring.

DESCRIPTION OF THE EMBODIMENTS

Now, an object recognition device and an object recognition method according to preferred embodiments of the present invention are described with reference to the accompanying drawings. In the illustration of the drawings, the same components or corresponding components are denoted by the same reference symbols, and the overlapping description thereof is herein omitted.

First Embodiment

Figure 1:
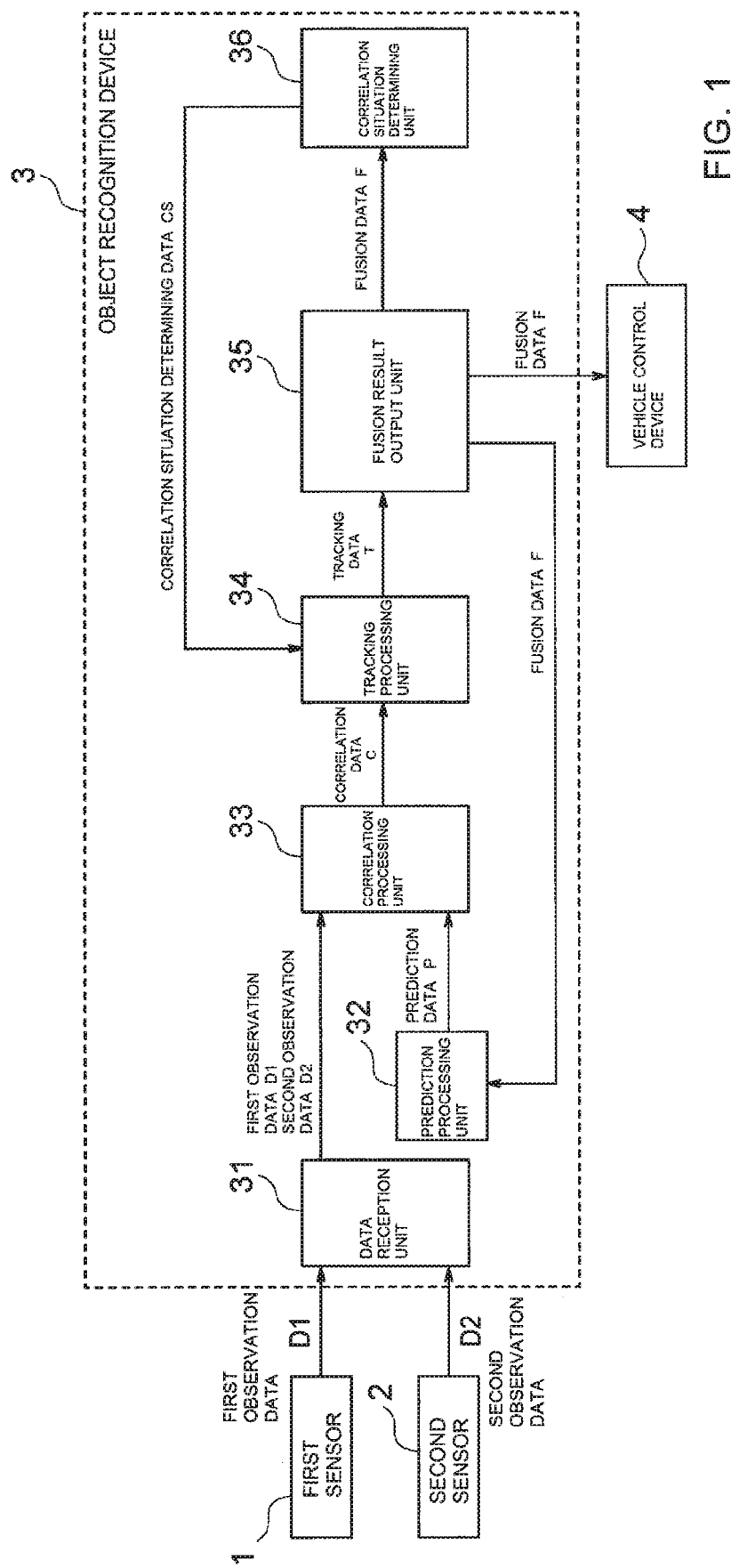
FIG. 1 is a block diagram for illustrating a configuration of a vehicle control system including an object recognition device according to a first embodiment of the present invention.

FIG. 1 is a block diagram for illustrating a configuration of a vehicle control system including an object recognition device 3 according to a first embodiment of the present invention. In FIG. 1, the vehicle control system includes a first sensor 1, a second sensor 2, the object recognition device 3, and a vehicle control device 4. A case in which two sensors are included is described in the first embodiment as an example. However, the number of sensors may be three or more.

The first sensor 1 and the second sensor 2 are installed in a vehicle to detect, as observation data D, information about a physical quantity indicating the state of an object present within a detectable range in the surroundings of their own vehicle, and to transmit the observation data D to the object recognition device 3. The observation data D includes information such as a position observation value indicating the relative position of the object relative to their own vehicle, a speed observation value indicating the relative speed of the object relative to their own vehicle, and an acceleration observation value indicating the relative acceleration of the object relative to their own vehicle.

In the following description, the observation data D detected by the first sensor 1 is referred to as "first observation data D1" and the observation data D detected by the second sensor 2 is referred to as "second observation data D2" for the sake of convenience, when it is required to notate the observation data D detected by the first sensor 1 and the observation data D detected by the second sensor 2 in a manner that discriminates one from the other.

Sensors to be used as the first sensor 1 and the second sensor 2 are, for example, sensors of a type that detects information about an object by receiving a detection wave, which is light, an electromagnetic wave, or the like that is emitted from the object, and performing signal processing, image processing, or other types of processing on the received detection wave. Sensors of a type that detects information about an object by applying a detection wave onto the object, receiving a portion of the detection wave that is reflected by the object, and performing processing on the received portion of the detection wave may also be used as the first sensor 1 and the second sensor 2. Specifically, the first sensor 1 and the second sensor 2 may be, for example, millimeter-wave radars, laser radars, ultrasonic sensors, infrared ray sensors, or optical cameras.

Positions at which the first sensor 1 and the second sensor 2 are installed in the vehicle and detection ranges of the first sensor 1 and the second sensor 2 are known. Further, positions at which the first sensor 1 and the second sensor 2 are installed in the vehicle and other conditions may be set at discretion. The first sensor 1 and the second sensor 2 may be sensors using detection methods different from each other, or sensors using the same detection method.

The object recognition device 3 generates fusion data F from the observation data D received from each of the first sensor 1 and the second sensor 2 to output the fusion data F. A data reception unit 31, a prediction processing unit 32, an association processing unit 33, a tracking processing unit 34, a fusion result output unit 35, and an association situation determining unit 36 are included among specific components of the object recognition device 3.

The data reception unit 31 receives the first observation data D1 from the first sensor 1 and receives the second observation data D2 from the second sensor 2. The first observation data D1 includes a position observation value Dp1, a speed observation value Dv1, and an acceleration observation value Da1. The second observation data D2 includes a position observation value Dp2, a speed observation value Dv2, and an acceleration observation value Da2. The data reception unit 31 outputs the received observation data D.

The prediction processing unit 32 executes prediction processing in which the previous value of the fusion data F output from the fusion result output unit 35 is used to generate prediction data P as the result of predicting the current value of the fusion data F in accordance with a specific movement model. In other words, the prediction processing unit 32 predicts the current value of the fusion data F by performing time transition on the previous value of the fusion data F in accordance with a specific movement model to output the result of the prediction as the prediction data P. The prediction data P includes a position prediction value Pp, a speed prediction value Pv, and an acceleration prediction value Pa.

The above-mentioned specific movement model is a model for preventing the prediction data P, which is the result of predicting the current value of the fusion data F, from undergoing a change from the previous value of the fusion data F that exceeds a tolerable range described later, and is determined in advance. In the first embodiment, a case in which the movement of an object detected by the sensors is assumed to be uniformly accelerated motion, and a uniformly accelerated motion model is employed as the specific movement model is described as an example.

The association processing unit 33 performs association processing in which association data C is generated. That is, the association processing unit 33 determines an association between the observation data D output from the data reception unit 31 and the prediction data P output from the prediction processing unit 32. The association processing unit 33 outputs the observation data D and the prediction data P along with the determined association as the association data C.

The association processing unit 33 is configured to determine the association between the observation data D and the prediction data P with the use of a known algorithm.

Examples of the known algorithm include a simple nearest neighbor (SNN) algorithm, a multiple hypothesis tracking (MHT) algorithm, a global nearest neighbor (GNN) algorithm, and a joint probabilistic data association (JPDA) algorithm.

The tracking processing unit 34 executes specialized tracking processing, which differs from normal tracking processing, when a fusion data discontinuity state described later occurs. The normal tracking processing is processing in which tracking data T is generated by updating the previous value of the tracking data T with the use of the prediction data P output from the prediction processing unit 32 and the observation data D associated with the prediction data P, and the generated tracking data T is output. The specialized tracking processing is processing in which an adjustment physical quantity for solving the fusion data discontinuity state is set, and the tracking data T that is equivalent to the prediction data P is output. Further details of the normal tracking processing and the specialized tracking processing are described later. The tracking processing unit 34 also executes tracking switching processing in which tracking processing to be executed is switched between the normal tracking processing and the specialized tracking processing. Specifically, the tracking processing unit 34 is configured to perform discontinuity determination for determining whether the fusion data discontinuity state is happening, and switch the tracking processing to be executed between the normal tracking processing and the specialized tracking processing based on the result of the discontinuity determination. When it is determined as a result of the discontinuity determination that the fusion data discontinuity state is happening, the tracking processing unit 34 switches the tracking processing to be executed from the normal tracking processing to the specialized tracking processing.

The tracking processing unit 34 refers to the previous value of association situation determining data CS, which is output from the association situation determining unit 36, as well in switching the tracking processing to be executed between the normal tracking processing and the specialized tracking processing. Details of the tracking switching processing are described later. The fusion data discontinuity state is described later with reference to FIG. 2.

The tracking processing unit 34 generates the tracking data T by executing the tracking processing that is selected in the tracking switching processing, with the use of the association data C output from the association processing unit 33.

When the tracking processing to be executed is the normal tracking processing, the tracking processing unit 34 generates and outputs the tracking data T by updating the previous value of the tracking data T with the use of the prediction data P and the observation data D associated with the prediction data P. In short, an updated value obtained by updating the previous value of the tracking data T is the generated tracking data T.

The tracking processing unit 34 is configured to update the previous value of the tracking data T by using a known tracking method. Examples of the known tracking method include the least-square method, the Kalman filter technique, and particle filtering.

When the tracking processing to be executed is the specialized tracking processing, the tracking processing unit 34 sets the adjustment physical quantity described later, and outputs the tracking data T that is equivalent to the prediction data P. Details of the specialized tracking processing are described later.

The fusion result output unit 35 executes fusion result update processing in which the current value of the fusion data F is generated. That is, when the tracking data T output from the tracking processing unit 34 is data obtained by executing the normal tracking processing, the fusion result output unit 35 outputs this tracking data T as the current value of the fusion data F.

When the tracking data T output from the tracking processing unit 34 is data obtained by executing the specialized tracking processing, the fusion result output unit 35 performs physical quantity control processing, which is described later, on the prediction data P equivalent to this tracking data T, and outputs the prediction data P processed by the physical quantity control processing as the current value of the fusion data F.

The fusion data F includes a position fusion value Fp, a speed fusion value Fv, and an acceleration fusion value Fa. Details of the fusion result update processing are described later.

The association situation determining unit 36 executes association situation determining processing in which the association situation determining data CS is generated with the use of the current value of the fusion data F that is output from the fusion result output unit 35. Specifically, the association situation determining unit 36 outputs the association situation determining data CS including a first association flag, a second association flag, and an association situation change flag.

The first association flag is a flag indicating the presence or absence of association between the first sensor 1 and the fusion data F. The second association flag is a flag indicating the presence or absence of association between the second sensor 2 and the fusion data F. The association situation change flag is a flag indicating, for each of the first sensor 1 and the second sensor 2, the presence or absence of a change in the situation of association between the sensor and the fusion data F. Details of the association situation determining processing are described later.

The vehicle control device 4 uses the current value of the fusion data F that is output from the fusion result output unit 35 to control the vehicle to be controlled by the vehicle control device 4. To give a specific example, when a collision between the controlled vehicle and a vehicle ahead of the controlled vehicle is predicted from the fusion data F, the vehicle control device 4 performs control so that an alarm installed in the controlled vehicle sounds an alarm, or so that a display installed in the controlled vehicle displays a message to that effect. To give another example, the vehicle control device 4 performs adaptive cruise control, lane keeping control, automatic braking control, and other types of control.

Figure 2:
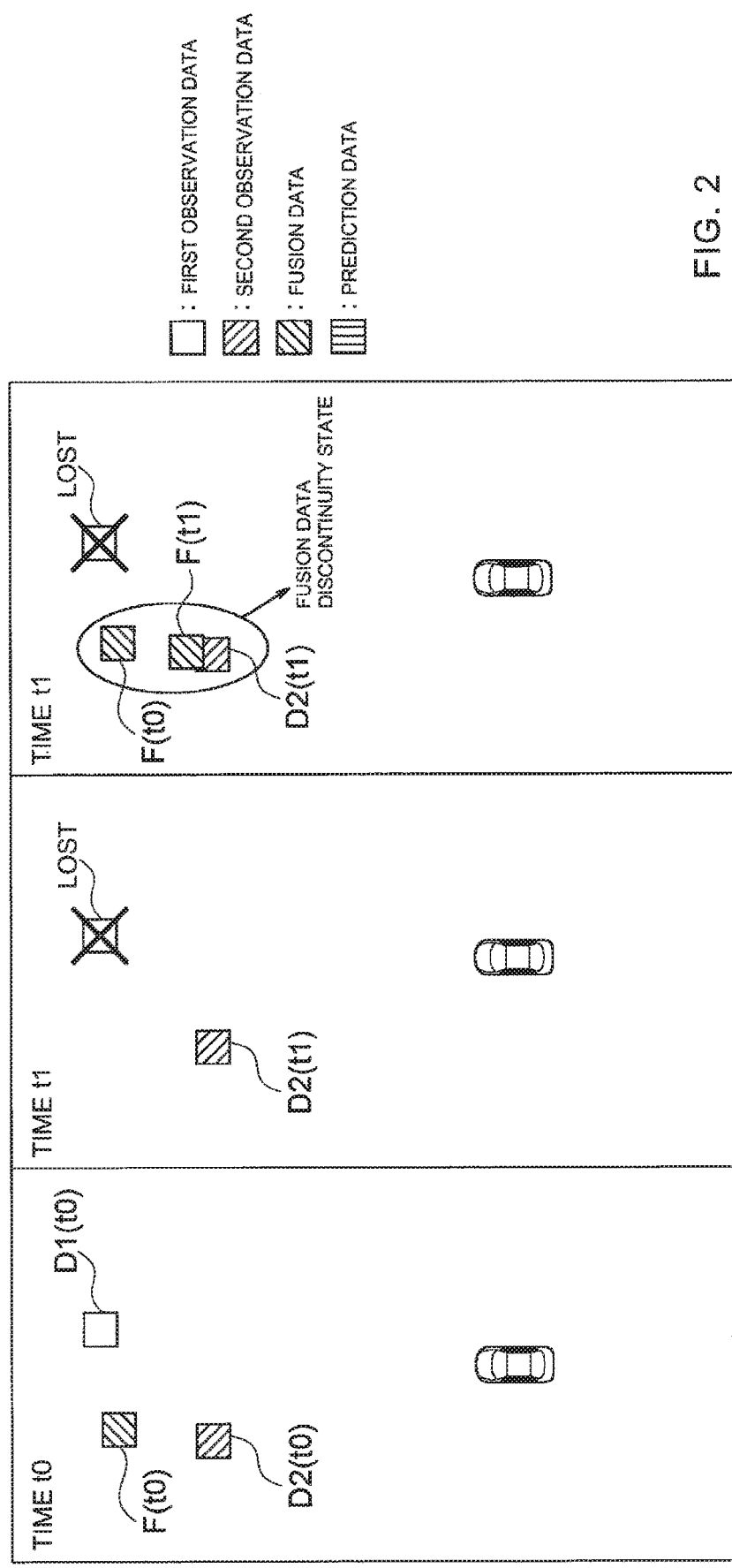
FIG. 2 is an explanatory diagram for illustrating changes with time of fusion data that is output from an object recognition device in a comparative example when a sensor is lost.

FIG. 2 is an explanatory diagram for illustrating changes with time of the fusion data F that is output from an object recognition device in a comparative example when a sensor is lost. The object recognition device in the comparative example does not execute the specialized tracking processing described above, and is configured to generate the fusion data F by executing only the normal tracking processing.

"A sensor is lost" means that the sensor has shifted from a state in which the sensor is associated with the fusion data to a state in which the sensor is not associated with the fusion data. Specifically, a sensor is lost when a situation in which the sensor fails to detect an object, or a situation in which no observation data D is input from the sensor to the object recognition device 3, occurs. In FIG. 2, a case in which the first sensor 1 is lost is illustrated as an example.

In the following description, data at a time tk (k=0, 1, . . . ) is noted by adding "(tk)" to the tail end of a symbol that is assigned to the data, for the sake of convenience. For instance, the first observation data D1 at the time tk is noted as "first observation data D1(tk)".

As illustrated in FIG. 2, the object recognition device 3 receives, at a time t0, the first observation data D1(t0) from the first sensor 1 and the second observation data D2(t0) from the second sensor 2. In this case, the first sensor 1 is associated with the fusion data F, and the second sensor 2 is similarly associated with the fusion data F.

At the time t0, the object recognition device 3 executes the normal tracking processing with the use of the first observation data D1(t0) and the second observation data D2(t0), to thereby generate the fusion data F(t0).

At a time t1, the object recognition device 3 receives the second observation data D2(t1) from the second sensor 2, whereas the first observation data D1(t1) is not received from the first sensor 1. In this case, the second sensor 2 is associated with the fusion data F(t0). The first sensor 1, on the other hand, is not associated with the fusion data F(t0). In other words, at the time t1, the first sensor 1 is lost and the number of sensors that are associated with the fusion data F out of the first sensor 1 and the second sensor 2 decreases from "2" to "1".

At the time t1, the object recognition device 3 executes the normal tracking processing with the use of the prediction data P(t1) predicted from the fusion data F(t0) and the second observation data D2(t1), to thereby generate the fusion data F(t1). When a gap between the prediction data P(t1) and the second observation data D2(t1) is great as illustrated in FIG. 2, the fusion data F(t1) is close to the second observation data D2(t1) and is considerably distant from the fusion data F(t0).

This may lead to a state in which a change of the current fusion data F(t1) from the previous fusion data F(t0) exceeds a tolerable range. A state in which a change of the fusion data F from the previous value to the current value exceeds a tolerable range is hereinafter referred to as "fusion data discontinuity state". "Tolerable range" here means a range in which the extent of a change of the fusion data F from the previous value to the current value is tolerable, more specifically, a range in which the extent of the change poses no inconvenience to, for example, vehicle control performed by the vehicle control device 4.

A decrease in the number of sensors associated with the fusion data F may thus lead to the fusion data discontinuity state, and may consequently affect vehicle control performed by the vehicle control device 4 to which the fusion data F is input. The fusion data discontinuity state may occur also when the number of sensors associated with the fusion data F increases.

A shift from a state in which the first sensor 1 and the second sensor 2 detect the same object to a state in which one of the sensors is lost is given as a specific example of a decrease in the number of sensors associated with the fusion data F. A shift from a state in which an object is detected by one of the two sensors to a state in which the object is detected by the two sensors is given as a specific example of an increase in the number of sensors associated with the fusion data F.

Figure 3:
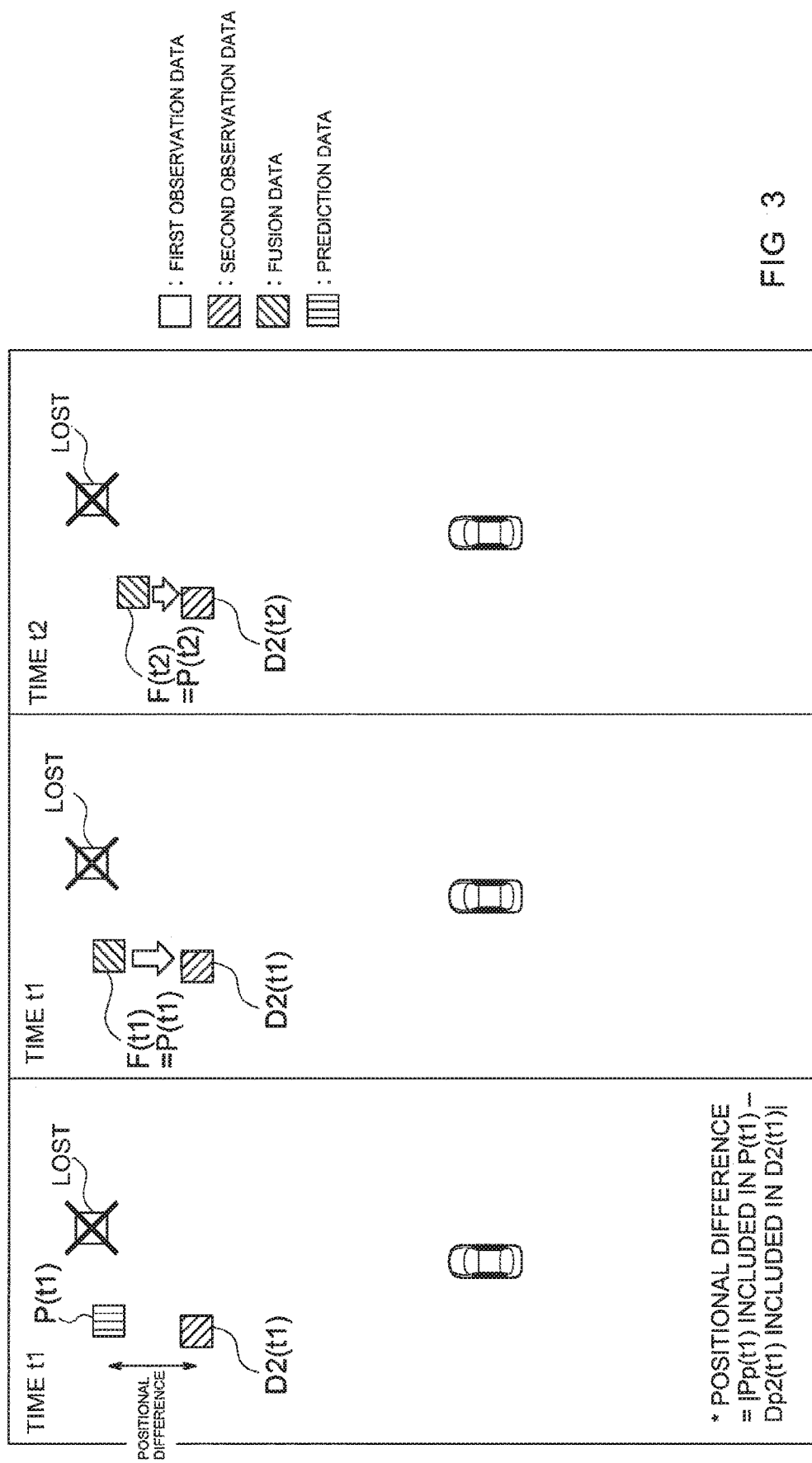
FIG. 3 is an explanatory diagram for illustrating changes with time of fusion data that is output from the object recognition device according to the first embodiment of the present invention when a sensor is lost.

FIG. 3 is an explanatory diagram for illustrating changes with time of the fusion data F that is output from the object recognition device 3 according to the first embodiment of the present invention when a sensor is lost.

As described in FIG. 3, at the time t1, similarly to the above-mentioned case of FIG. 2, the data reception unit 31 of the object recognition device 3 receives the second observation data D2(t1) from the second sensor 2, whereas the first observation data D1(t1) is not received from the first sensor 1. Therefore, the first sensor 1 is lost and the number of sensors that are associated with the fusion data F out of the first sensor 1 and the second sensor 2 decreases from "2" to "1".

At the time t1, in the situation described above, the tracking processing unit 34 of the object recognition device 3 calculates a positional difference that is the magnitude of a difference between the position prediction value Pp(t1) included in the prediction data P(t1) and the position observation value Dp2(t1) included in the second observation data D2(t1). When the calculated positional difference is equal to or larger than a threshold value, the tracking processing unit 34 makes a switch from the normal tracking processing to the specialized tracking processing, and starts the specialized tracking processing. The object recognition device 3 then outputs the prediction data P(t1) as the fusion data F(t1).

At a time t2, the prediction processing unit 32 of the object recognition device 3 performs time transition from the time t1 to the time t2 on the fusion data F(t1), in accordance with a specific movement model. The prediction processing unit 32 generates, as the prediction data P(t2), a value that is obtained by performing time transition on the fusion data F(t1) in this manner.

A uniformly accelerated motion model is used as the specific movement model as described above. In this case, the prediction processing unit 32 causes uniformly accelerated motion of the fusion data F(t1) toward the second observation data D2(t1) from the time t1 to the time t2. The prediction processing unit 32 generates, as the prediction data P(t2), a value that is obtained by performing time transition on the fusion data F(t1) in accordance with the uniformly accelerated motion in this manner.

The time transition performed on the fusion data F toward the second observation data D2 in accordance with the uniformly accelerated motion continues past the time t2, while adjusting the acceleration, thereby being capable of preventing the state in which a change of the fusion data F from the previous value to the current value exceeds the tolerable range, namely, the fusion data discontinuity state.

The tracking processing unit 34 is thus configured to make a switch from the normal tracking processing described above to the specialized tracking processing described above, based on the positional difference between the position observation value Dp2 and the position prediction value Pp, when the number of sensors associated with the fusion data F changes. Details of the positional difference are described later.

This enables the object recognition device 3 to prevent the fusion data discontinuity state described above from occurring despite a change in the number of sensors associated with the fusion data F. The object recognition device 3 according to the first embodiment can consequently prevent the change in number from affecting vehicle control performed by the vehicle control device 4 to which the fusion data F is input, unlike the object recognition device in the comparative example described above.

<Processing of the Object Recognition Device 3>

Figure 4:
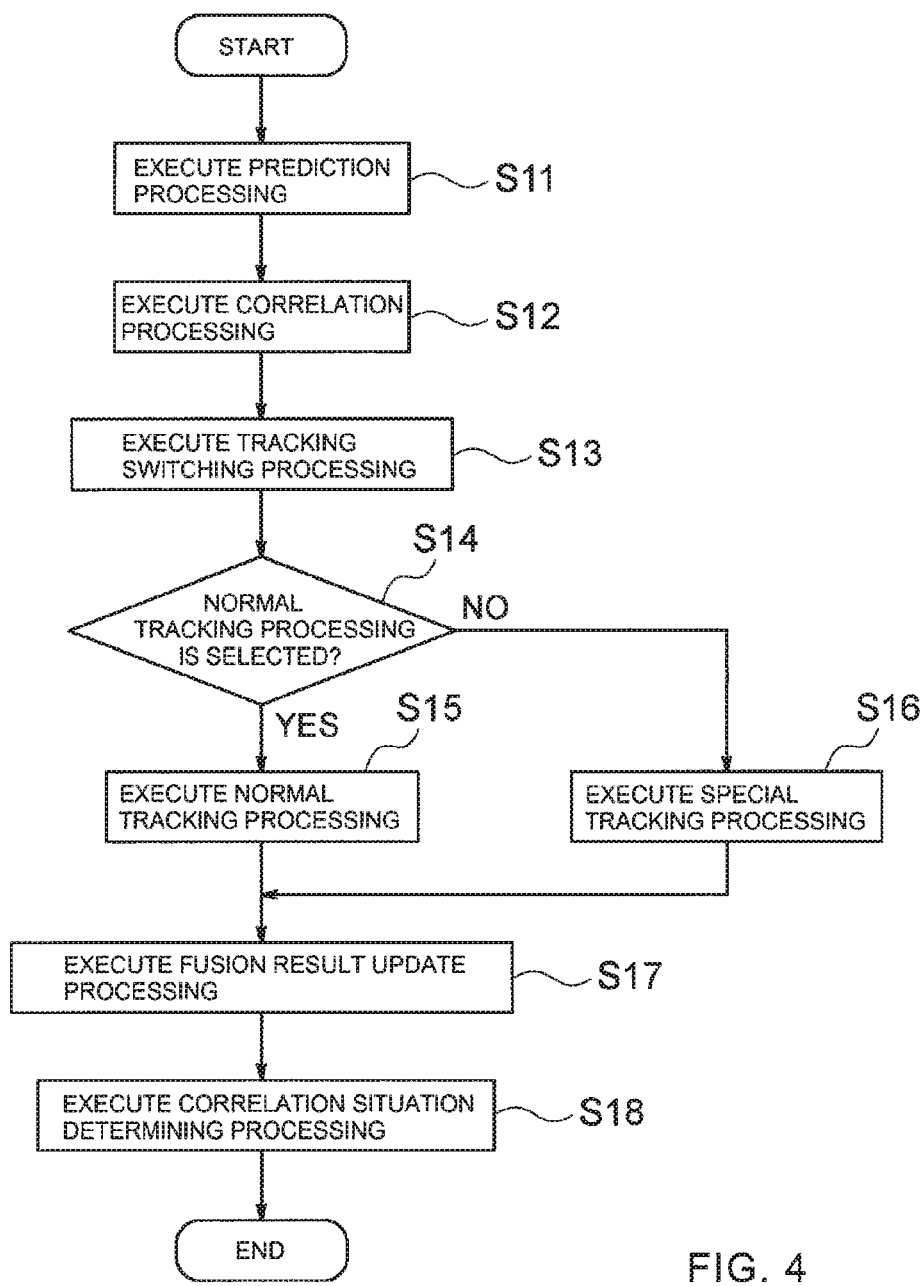
FIG. 4 is a flow chart for illustrating a series of processing procedures of the object recognition device according to the first embodiment of the present invention.

Processing of the object recognition device is described next with reference to FIG. 4. FIG. 4 is a flow chart for illustrating a series of processing procedures of the object recognition device according to the first embodiment of the present invention. The object recognition device repeatedly executes the processing procedures in a certain operation cycle. In the following description on the contents of the processing procedures, the series of processing procedures of the object recognition device 3 is started at the time tk (k=0, 1, . . . ) described above.

In Step S11, the prediction processing unit 32 generates the prediction data P(tk) by executing the prediction processing. The series of processing procedures then proceeds to Step S12.

In Step S12, the association processing unit 33 generates the association data C(tk) by executing the association processing. The series of processing procedures then proceeds to Step S13.

In Step S13, the tracking processing unit 34 executes the tracking switching processing. The series of processing procedures then proceeds to Step S14.

In Step S14, the tracking processing unit 34 determines whether the normal tracking processing has been selected in the tracking switching processing. When it is determined that the normal tracking processing has been selected, the series of processing procedures proceeds to Step S15. When it is determined that the specialized tracking processing has been selected, the series of processing procedures proceeds to Step S16.

In Step S15, the tracking processing unit 34 generates the tracking data T(tk) by executing the normal tracking processing. The series of processing procedures then proceeds to Step S17.

In Step S16, the tracking processing unit 34 generates the tracking data T(tk) by executing the specialized tracking processing. The series of processing procedures then proceeds to Step S17.

In Step S17, the fusion result output unit 35 generates the fusion data F(tk) by executing the fusion result update processing. The series of processing procedures then proceeds to Step S18.

In Step S18, the association situation determining unit 36 generates the association situation determining data CS(tk) by executing the association situation determining processing. The series of processing procedures is then ended.

<Tracking Switching Processing>

Figure 5:
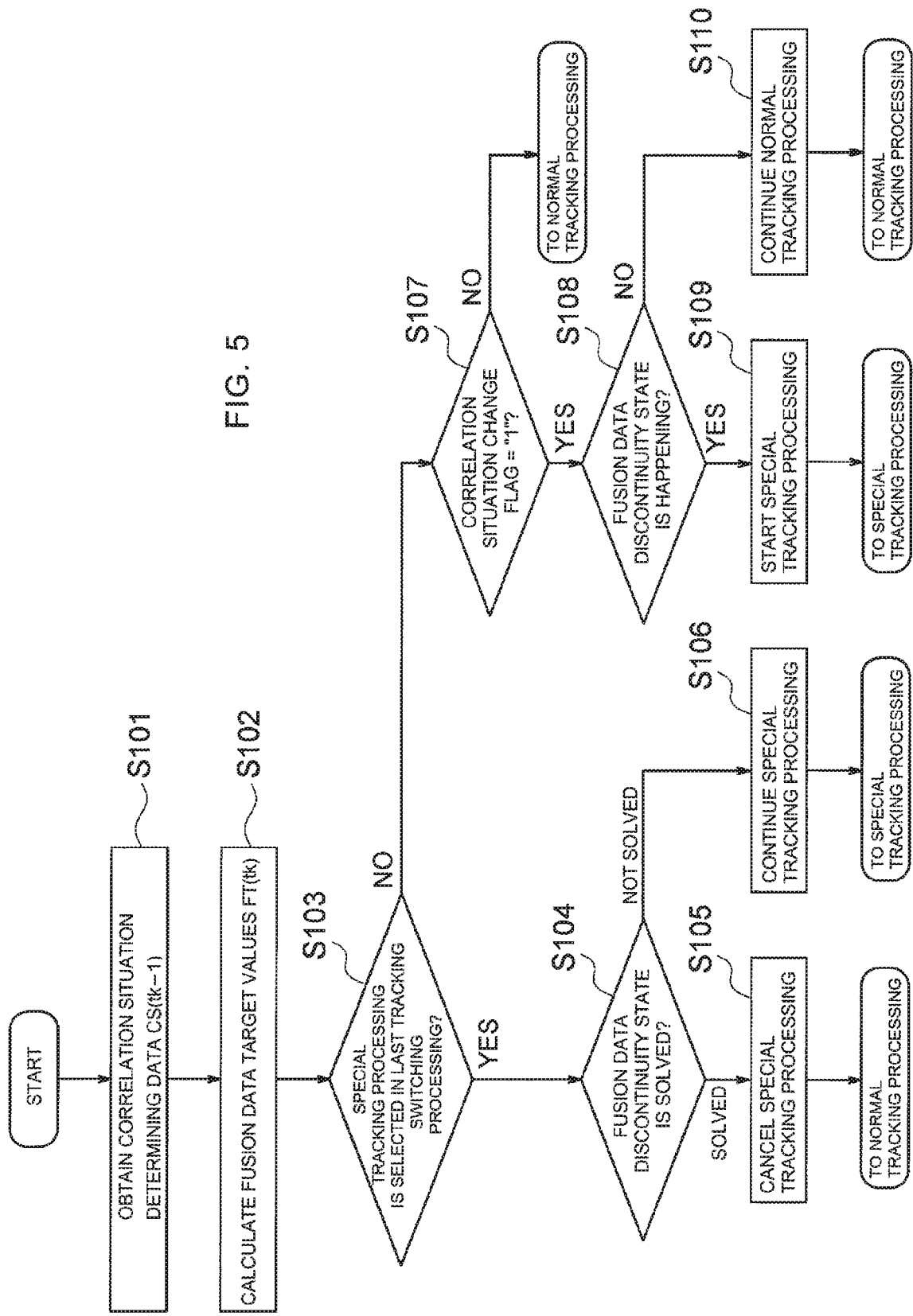
FIG. 5 is a flow chart for illustrating a series of steps of tracking switching processing, which is executed by a tracking processing unit in the first embodiment of the present invention.

The tracking switching processing to be executed by the tracking processing unit 34 is described next with reference to FIG. 5. FIG. 5 is a flow chart for illustrating a series of steps of the tracking switching processing, which is executed by the tracking processing unit 34 in the first embodiment of the present invention.

In Step S101, the tracking processing unit 34 obtains the previous association situation determining data CS(tk−1) output from the association situation determining unit 36. The tracking switching processing then proceeds to Step S102.

In Step S102, the tracking processing unit 34 calculates fusion data target values FT(tk) based on the first observation data D1(tk), which is detected by the first sensor 1, and the second observation data D2(tk), which is detected by the second sensor 2. The tracking switching processing then proceeds to Step S103.

The fusion data target values FT are now described. The fusion data target values FT are calculated by obtaining a weighted average of the observation data D with the use of dispersion values that indicate the precisions of the observation data D detected by the first sensor 1 and the observation data D detected by the second sensor 2. When one of the first sensor 1 and the second sensor 2 is lost, however, the observation data D detected by the other sensor, namely, the sensor that is not lost, is calculated as the fusion data target values FT without modification.

The fusion data target values FT include a position target value FTp, a speed target value FTv, and an acceleration target value FTa.

Returning to the description of FIG. 5, the tracking processing unit 34 determines, in Step S103, whether the specialized tracking processing has been selected in the last tracking switching processing, namely, the tracking switching processing executed at the time tk−1. The tracking switching processing proceeds to Step S104 when it is determined that the specialized tracking processing has been selected in the last tracking switching processing, and to Step S107 when it is determined that the specialized tracking processing has not been selected in the last tracking switching processing.

In Step S104, the tracking processing unit 34 executes the discontinuity determination to determine whether the fusion data discontinuity state has been solved, that is, whether the fusion data discontinuity state is happening.

Specifically, the tracking processing unit 34 calculates a positional difference that is the magnitude of a difference between the position target value FTp(tk) included among the fusion data target values FT(tk), which have been calculated in Step S102, and the position prediction value Pp(tk) included in the prediction data P(tk), which is output from the prediction processing unit 32.

When the calculated positional difference is equal to or larger than a first set threshold value, the tracking processing unit 34 determines that the fusion data discontinuity state is unsolved, that is, that the fusion data discontinuity state is happening. When the calculated positional difference is smaller than the first set threshold value, on the other hand, the tracking processing unit 34 determines that the fusion data discontinuity state has been solved, that is, that no fusion data discontinuity state is observed.

In this manner, the tracking processing unit 34 detects a situation in which temporal discontinuity of the fusion data F may occur by comparison of the positional difference between the position target value FTp and the position prediction value Pp to the first set threshold value. When it is determined in the discontinuity determination that the fusion data discontinuity state is unsolved, that is, that the fusion data discontinuity state is happening, the tracking switching processing proceeds to Step S106. When it is determined that the fusion data discontinuity state has been solved, that is, that no fusion data discontinuity state is observed, the tracking switching processing proceeds to Step S105.

In Step S105, the tracking processing unit 34 cancels the specialized tracking processing selected in the last tracking switching processing, and selects the normal tracking processing. The tracking processing unit 34 in this case executes the normal tracking processing.

As is understood from Step S103 to Step S105 described above, the tracking processing unit 34 makes a switch from the specialized tracking processing to the normal tracking processing when it is determined as a result of the discontinuity determination after a switch from the normal tracking processing to the specialized tracking processing that no fusion data discontinuity state is observed.

In Step S106, the tracking processing unit 34 continues the specialized tracking processing selected in the last tracking switching processing. The tracking processing unit 34 in this case maintains the selection of the specialized tracking switching, and executes the specialized tracking processing.

As is understood from Step S103, Step S104, and Step S106 described above, the tracking processing unit 34 continues the specialized tracking processing when it is determined as a result of the discontinuity determination after a switch from the normal tracking processing to the specialized tracking processing that the fusion data discontinuity state is unsolved, that is, that the fusion data discontinuity state is happening. This enables the object recognition device 3 to continue executing the specialized tracking processing when the fusion data discontinuity state is unsolved.

In Step S107, the tracking processing unit 34 determines whether the association situation change flag that is included in the association situation determining data CS(tk−1) obtained in Step S101 has a value "1". When the value of the association situation change flag is "1", the tracking switching processing proceeds to Step S108. When the value of the association situation change flag is "0", the tracking processing unit 34 executes the normal tracking processing.

As an exception, the tracking switching processing is configured to move from Step S107 to Step S108 when the value of the association situation change flag included in the association situation determining data CS(tk−1) is "0" and the first sensor 1 is associated with the fusion data F at the time tk. The same applies to the second sensor 2.

The tracking switching processing is configured to move from Step S107 to Step S108 also when the tracking processing unit 34 determines that a change in the number of sensors associated with the fusion data F has occurred at the time tk by referring to the association situation determining data CS(tk−1).

In Step S108, the tracking processing unit 34 executes the discontinuity determination to determine whether the fusion data discontinuity state is happening.

Specifically, the tracking processing unit 34 calculates a positional difference that is the magnitude of a difference between the position target value FTp(tk) included among the fusion data target values FT(tk), which have been calculated in Step S102, and the position prediction value Pp(tk) included in the prediction data P(tk), which is output from the prediction processing unit 32.

When the calculated positional difference is equal to or larger than a second set threshold value, the tracking processing unit 34 determines that the fusion data discontinuity state is happening. When the calculated positional difference is smaller than the second set threshold value, on the other hand, the tracking processing unit 34 determines that no fusion data discontinuity state is observed. The second set threshold value is higher than the first set threshold value. The first set threshold value and the second set threshold value may each be a fixed value or a variable. When the first set threshold value and the second set threshold value are set as fixed values, the second set threshold value is set to, for example, 3 m and the first set threshold value is set to 0.1 m. When the second set threshold value is set as a variable, the second set threshold value is set by, for example, obtaining position information through uniformly accelerated motion of the previous fusion data F(tk−1) that lasts from the previous time tk−1 to the current time tk, and using a value that allows for error of the positional information as the second set threshold value.

In this manner, the tracking processing unit 34 detects a situation in which temporal discontinuity of the fusion data F may occur by comparison of the positional difference between the position target value FTp and the position prediction value Pp to the second set threshold value. When it is determined in the discontinuity determination that the fusion data discontinuity state is happening, the tracking switching processing proceeds to Step S109. When it is determined that no fusion data discontinuity state is observed, the tracking switching processing proceeds to Step S110.

In Step S109, the tracking processing unit 34 makes a switch from the normal tracking processing selected in the last tracking switching processing to the specialized tracking processing to start the specialized tracking processing. The tracking processing unit 34 in this case executes the specialized tracking processing.

As is understood from Step S108 and Step S109 described above, the tracking processing unit 34 performs the discontinuity determination, and switches the tracking processing to be executed from the normal tracking processing to the specialized tracking processing when it is determined as a result of the discontinuity determination that the fusion data discontinuity state is happening. This enables the object recognition device 3 to ensure the continuity of output of the fusion data F even in the fusion data discontinuity state, by executing the specialized tracking processing.

As is understood from Step S107 to Step S109 described above, the tracking processing unit 34 performs the discontinuity determination when the number of sensors associated with the fusion data F changes. The tracking processing unit 34 performs the discontinuity determination also when the association situation change flag included in the association situation determining data CS(tk−1) has a value "1", namely, when there is a change in the situations of association between the first sensor 1 and the fusion data F and between the second sensor 2 and the fusion data F.

The tracking processing unit 34 switches the tracking processing to be executed from the normal tracking processing to the specialized tracking processing when it is determined as a result of the discontinuity determination that the fusion data discontinuity state is happening. This enables the object recognition device 3 to ensure the continuity of output of the fusion data F even in the fusion data discontinuity state, by executing the specialized tracking processing.

The tracking processing unit 34 may be configured to execute prevention processing in which the fusion data discontinuity state is prevented from occurring, when a switch from the specialized tracking processing to the normal tracking processing is made in Step S105. Specifically, the tracking processing unit 34 executes processing described below as the prevention processing.

The tracking processing unit 34 saves an error covariance matrix that has been used in the normal tracking processing when a switch from the normal tracking processing to the specialized tracking processing is made in Step S109. The tracking processing unit 34 uses the saved error covariance matrix to execute the normal tracking processing when a switch from the specialized tracking processing to the normal tracking processing is made in Step S105.

This enables the object recognition device 3 to deal with a case in which the error covariance matrix, which is provided for each object and updated in the normal tracking processing, is not updated in the specialized tracking processing and consequently retains unsuitable values. When an error covariance matrix having unsuitable values is used in the normal tracking processing, rapid closing of the gap from the fusion data F to the observation data D or other factors may cause the fusion data discontinuity state. The fusion data discontinuity state that may occur at the switch from the specialized tracking processing to the normal tracking processing can be prevented by configuring the tracking processing unit 34 to execute the prevention processing described above.

In Step S110, the tracking processing unit 34 continues the normal tracking processing selected in the last tracking switching processing. The tracking processing unit 34 in this case continues the selection of the normal tracking switching, and executes the normal tracking processing.

<Specialized Tracking Processing>

Figure 6:
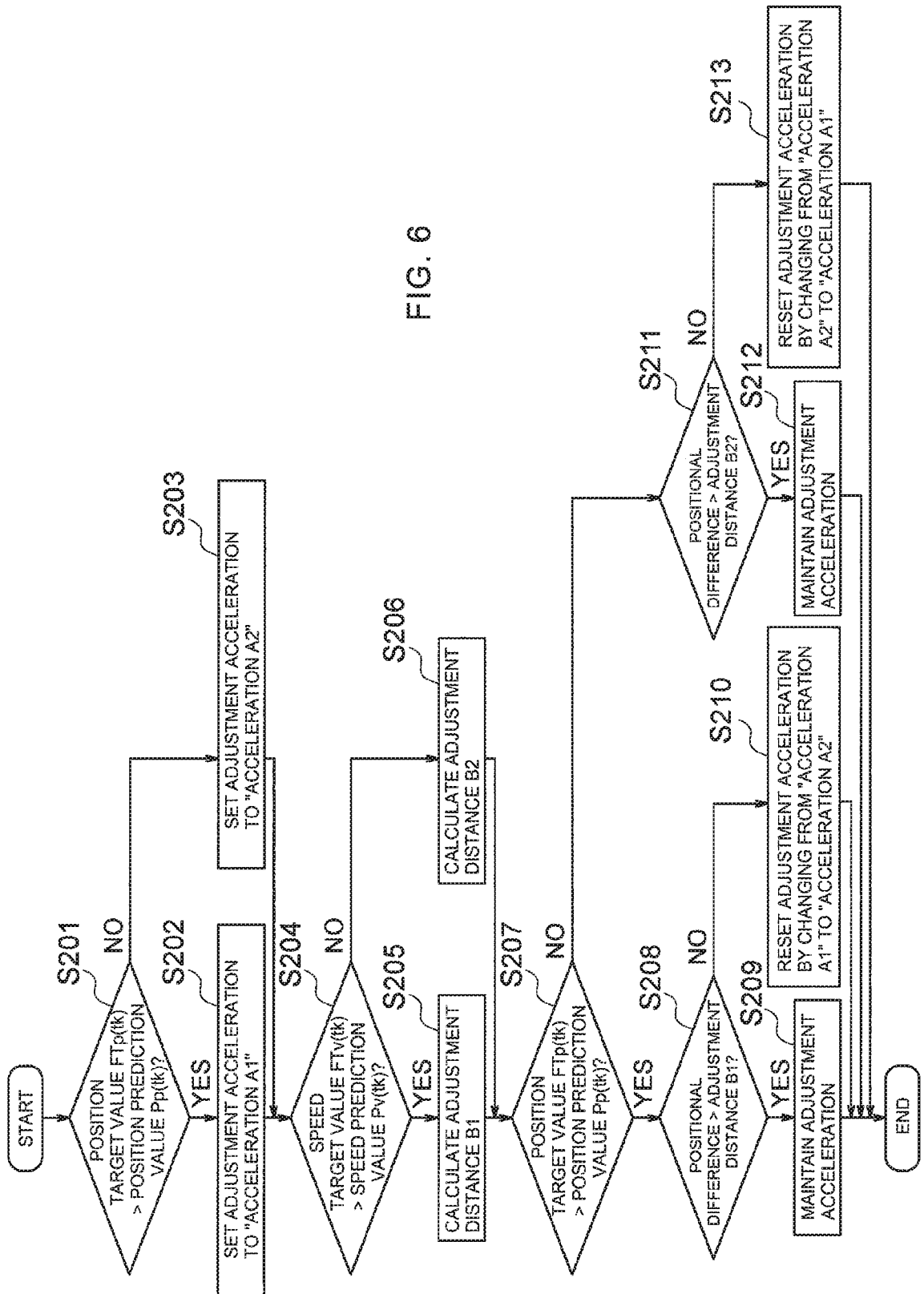
FIG. 6 is a flow chart for illustrating a series of steps of specialized tracking processing, which is executed by the tracking processing unit in the first embodiment of the present invention.

The specialized tracking processing to be executed by the tracking processing unit 34 is described next with reference to FIG. 6. FIG. 6 is a flow chart for illustrating a series of steps of the specialized tracking processing, which is executed by the tracking processing unit 34 in the first embodiment of the present invention.

In Step S201, the tracking processing unit 34 determines whether the position target value FTp(tk) included among the fusion data target values FT(tk), which are calculated in the tracking switching processing is larger than the position prediction value Pp(tk) included in the prediction data P(tk), which is predicted by the prediction processing unit 32. When it is determined that the position target value FTp(tk) is larger than the position prediction value Pp(tk), the specialized tracking processing proceeds to Step S202. The specialized tracking processing proceeds to Step S203 when it is determined that the position target value FTp(tk) is equal to or smaller than the position prediction value Pp(tk).

In Step S202, the tracking processing unit 34 sets the adjustment acceleration to "acceleration A1". The specialized tracking processing then proceeds to Step S204. The acceleration A1 is a value set in advance and a positive value.

In Step S203, the tracking processing unit 34 sets the adjustment acceleration to "acceleration A2". The specialized tracking processing then proceeds to Step S204. The acceleration A2 is a value set in advance and a negative value. A negative acceleration is also called a deceleration rate.

The adjustment acceleration set in Step S202 or Step S203 is an example of the adjustment physical quantity for preventing the state in which a change of the fusion data F from the previous value to the current value exceeds the tolerable range, namely, the fusion data discontinuity state.

As is understood from Step S201 to Step S203 described above, the value of the adjustment acceleration is determined depending on the positional relationship between the fusion data target value FT(tk) and the prediction data P(tk).

In Step S204, the tracking processing unit 34 determines whether the speed target value FTv(tk) included among the fusion data target values FT(tk) is larger than the speed prediction value Pv(tk) included in the prediction data P(tk). When it is determined that the speed target value FTv(tk) is larger than the speed prediction value Pv(tk), the specialized tracking processing proceeds to Step S205. The specialized tracking processing proceeds to Step S206 when it is determined that the speed target value FTv(tk) is equal to or smaller than the speed prediction value Pv(tk).

In Step S205, the tracking processing unit 34 calculates an adjustment distance B1. The specialized tracking processing then proceeds to Step S207. The adjustment distance B1 is a distance required to eliminate a positive speed difference $\Delta v(tk)$, which is obtained by subtracting the speed prediction value Pv(tk) from the speed target value FTv(tk), with the adjustment acceleration. The adjustment distance B1 is calculated by, for example, an expression given below.

$$B1 = (T \times Pv(tk)) + (0.5 \times (\text{adjustment acceleration}) \times T^2),$$

where $T = \Delta v(tk)/(\text{adjustment acceleration})$

In Step S206, the tracking processing unit 34 calculates an adjustment distance B2. The specialized tracking processing then proceeds to Step S207. The adjustment distance B2 is a distance required to eliminate a negative speed difference obtained by subtracting the speed prediction value Pv(tk) from the speed target value FTv(tk) with the adjustment acceleration. The adjustment distance B2 is calculated by the same method that is used to calculate the adjustment distance B1.

In Step S207, the tracking processing unit 34 executes the same step as Step S201. The specialized tracking processing proceeds to Step S208 when it is determined that the position target value FTp(tk) is larger than the position prediction value Pp(tk). The specialized tracking processing proceeds to Step S211 when it is determined that the position target value FTp(tk) is equal to or smaller than the position prediction value Pp(tk).

In Step S208, the tracking processing unit 34 calculates a positional difference that is the magnitude of a difference between the position prediction value Pp(tk) and the position target value FTp(tk), and determines whether the calculated positional difference is larger than the adjustment distance B1. When it is determined that the positional difference is larger than the adjustment distance B1, the specialized tracking processing proceeds to Step S209. The specialized tracking processing proceeds to Step S210 when it is determined that the positional difference is equal to or smaller than the adjustment distance B1.

In Step S209, the tracking processing unit 34 maintains the adjustment acceleration set in Step S202. The specialized tracking processing is then ended.

In Step S210, the tracking processing unit 34 resets the adjustment acceleration set in Step S202 by changing the adjustment acceleration from "acceleration A1" to "acceleration A2". The specialized tracking processing is then ended. In this case, the deceleration of the fusion data F(tk) is started by the acceleration A2, which is a negative value.

In Step S211, the tracking processing unit 34 calculates a positional difference that is the magnitude of a difference between the position prediction value Pp(tk) and the position target value FTp(tk), and determines whether the calculated positional difference is larger than the adjustment distance B2. When it is determined that the positional difference is larger than the adjustment distance B2, the specialized tracking processing proceeds to Step S212. The specialized tracking processing proceeds to Step S213 when it is determined that the positional difference is equal to or smaller than the adjustment distance B2.

In Step S212, the tracking processing unit 34 maintains the adjustment acceleration set in Step S203. The specialized tracking processing is then ended.

In Step S213, the tracking processing unit 34 resets the adjustment acceleration set in Step S203 by changing the adjustment acceleration from "acceleration A2" to "acceleration A1". The specialized tracking processing is then ended. In this case, the acceleration of the fusion data F (tk) is started by the acceleration A1, which is a positive value.

As is understood from Step S204 to Step S213 described above, the tracking processing unit 34 calculates the adjustment distance and the positional difference, and revises the adjustment acceleration set in Step S202 or Step S203, depending on the calculated adjustment distance and positional difference. This enables the object recognition device 3 to close the gap from the position fusion value Fp to the position target value FTp, and close the gap from the speed fusion value Fv to the speed target value FTv as well.

After completing the setting of the adjustment acceleration described above, the tracking processing unit 34 outputs the tracking data T(tk) that is equivalent to the prediction data P(tk) to the fusion result output unit 35.

<Fusion Result Update Processing>

Figure 7:
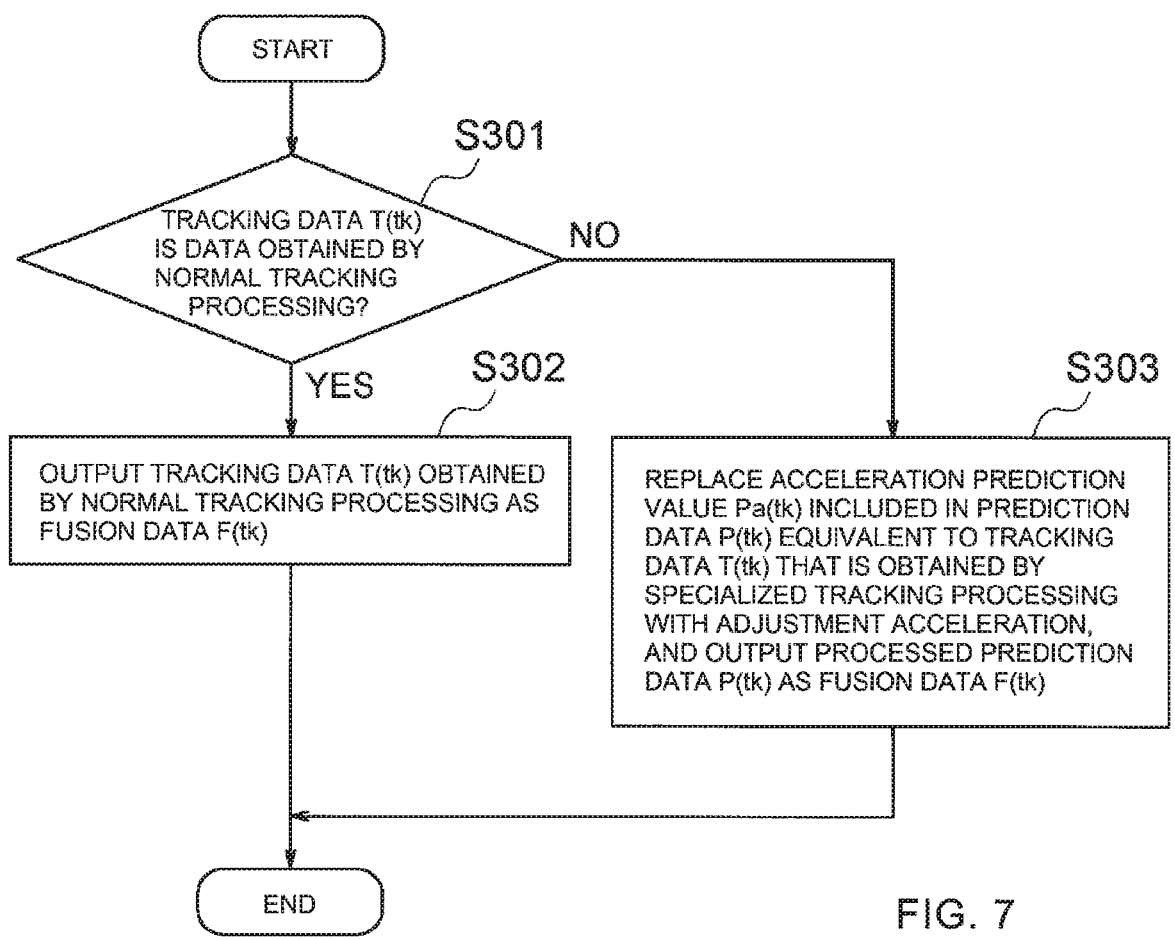
FIG. 7 is a flow chart for illustrating a series of steps of fusion result update processing, which is executed by a fusion result output unit in the first embodiment of the present invention.

The fusion result update processing to be executed by the fusion result output unit 35 is described next with reference to FIG. 7. FIG. 7 is a flow chart for illustrating a series of steps of the fusion result update processing, which is executed by the fusion result output unit 35 in the first embodiment of the present invention.

In Step S301, the fusion result output unit 35 determines whether the tracking data T(tk) input from the tracking processing unit 34 is data obtained by executing the normal tracking processing. When it is determined that the tracking data T(tk) is data obtained by executing the normal tracking processing, the fusion result update processing proceeds to Step S302. The fusion result update processing proceeds to Step S303 when it is determined that the tracking data T(tk) is not data obtained by executing the normal tracking processing.

In Step S302, the fusion result output unit 35 outputs the tracking data T(tk) that has been obtained by executing the normal tracking processing as the fusion data F(tk).

In Step S303, the fusion result output unit 35 performs the physical quantity control processing on the prediction data P(tk) equivalent to the tracking data T(tk) that has been obtained by executing the specialized tracking processing, and outputs the prediction data P processed by the physical quantity control processing as the fusion data F. Specifically, the fusion result output unit 35 in Step S303 replaces the acceleration prediction value Pa(tk) included in the prediction data P(tk) with the adjustment acceleration that is set in the specialized tracking processing described above, and outputs the post-replacement prediction data P(tk) as the fusion data F(tk). In this case, the acceleration fusion value Fa(tk) included in the fusion data F(tk) is equivalent to the adjustment acceleration.

As is understood from Step S303 described above, when the tracking data T(tk) output from the tracking processing unit 34 is data obtained by executing the normal tracking processing, the fusion result output unit 35 replaces the acceleration prediction value Pa(tk), which is an example of predicted values of specific physical quantities included in the prediction data P(tk) equivalent to the tracking data T(tk), with the adjustment acceleration, which is an example of the adjustment physical quantity. The fusion result output unit 35 outputs the post-replacement fusion data P(tk) as the fusion data F(tk).

The fusion data F processed in this manner enables the prediction processing unit 32 to which the fusion data F is input to generate the prediction data P that transitions smoothly with the passage of time, in the prediction processing that is executed after the tracking processing to be executed by the tracking processing unit 34 is switched to the specialized tracking processing. As a result, this enables the continuity of output of the fusion data F to be ensured even in the fusion data discontinuity state.

<Association Situation Determining Processing>

Figure 8:
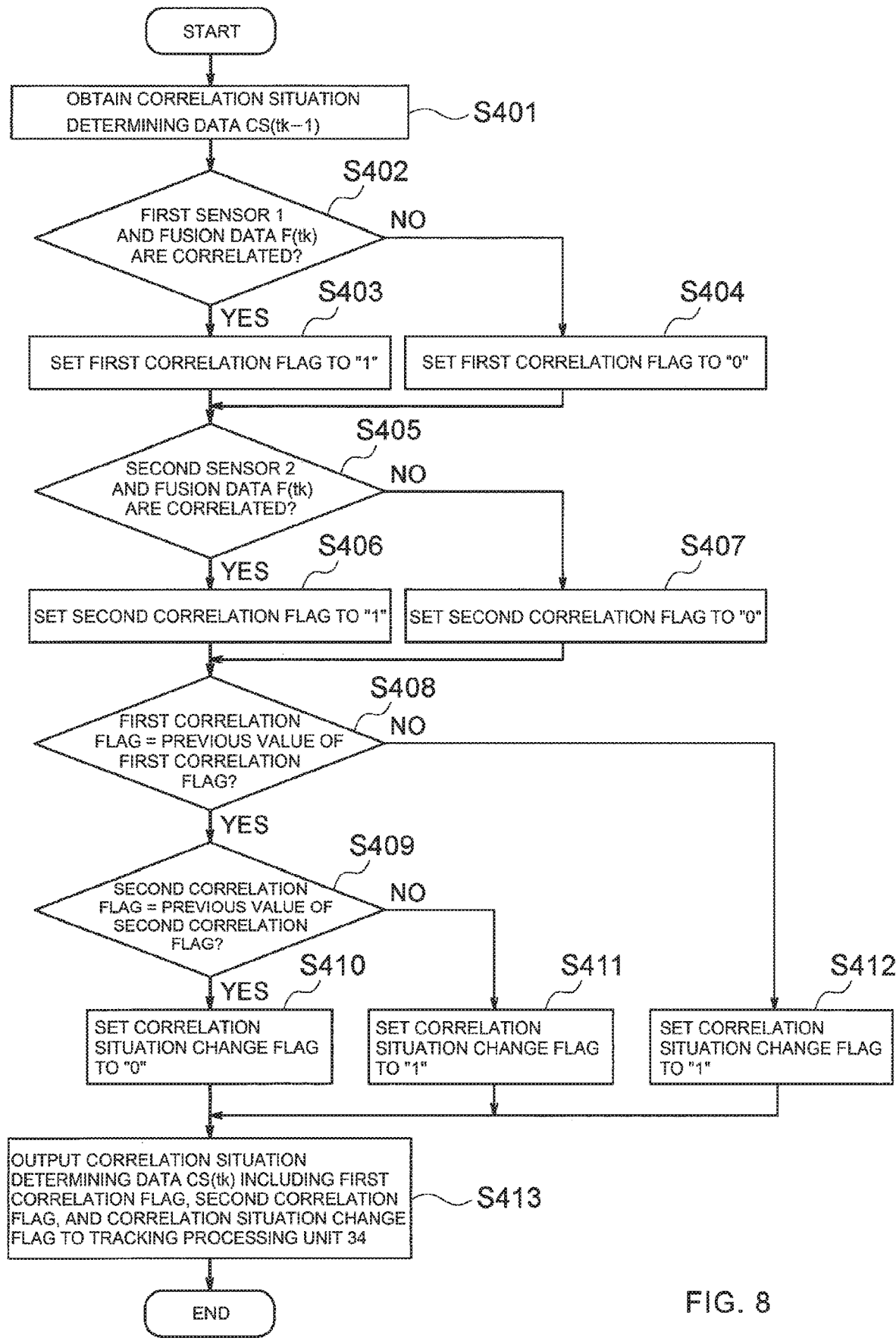
FIG. 8 is a flow chart for illustrating a series of steps of association situation determining processing, which is executed by a association situation determining unit in the first embodiment of the present invention.

The association situation determining processing to be executed by the association situation determining unit 36 is described next with reference to FIG. 8. FIG. 8 is a flow chart for illustrating a series of steps of the association situation determining processing, which is executed by the association situation determining unit 36 in the first embodiment of the present invention.

In Step S401, the association situation determining unit 36 obtains the association situation determining data CS(tk−1), which has been obtained in the last association situation determining processing, namely, the association situation determining processing executed at the time tk−1. The association situation determining processing then proceeds to Step S402.

In Step S402, the association situation determining unit 36 determines whether the first sensor 1 and the fusion data F(tk) are associated with each other. When it is determined that the first sensor 1 and the fusion data F(tk) are associated with each other, the association situation determining processing proceeds to Step S403. The association situation determining processing proceeds to Step S404 when it is determined that the first sensor 1 and the fusion data F(tk) are not associated with each other.

In Step S403, the association situation determining unit 36 sets the first association flag to "1". The association situation determining processing then proceeds to Step S405. The fact that the first association flag is "1" is equivalent to the fact that the first sensor 1 and the fusion data F(tk) are associated with each other.

In Step S404, the association situation determining unit 36 sets the first association flag to "0". The association situation determining processing then proceeds to Step S405. The fact that the first association flag is "0" is equivalent to the fact that the first sensor 1 and the fusion data F(tk) are not associated with each other.

In Step S405, the association situation determining unit 36 determines whether the second sensor 2 and the fusion data F(tk) are associated with each other. When it is determined that the second sensor 2 and the fusion data F(tk) are associated with each other, the association situation determining processing proceeds to Step S406. The association situation determining processing proceeds to Step S407 when it is determined that the second sensor 2 and the fusion data F(tk) are not associated with each other.

In Step S406, the association situation determining unit 36 sets the second association flag to "1". The association situation determining processing then proceeds to Step S408. The fact that the second association flag is "1" is equivalent to the fact that the second sensor 2 and the fusion data F(tk) are associated with each other.

In Step S407, the association situation determining unit 36 sets the second association flag to "0". The association situation determining processing then proceeds to Step S408. The fact that the second association flag is "0" is equivalent to the fact that the second sensor 2 and the fusion data F(tk) are not associated with each other.

In Step S408, the association situation determining unit 36 determines whether the value of the first association flag set in Step S403 or Step S404 is the same as the value of the first association flag included in the association situation determining data CS(tk−1). When it is determined that the current first association flag value and the previous first association flag value are the same, the association situation determining processing proceeds to Step S409. The association situation determining processing proceeds to Step S412 when it is determined that the current first association flag value and the previous first association flag value are different from each other.

In Step S409, the association situation determining unit 36 determines whether the value of the second association flag set in Step S406 or Step S407 is the same as the value of the second association flag included in the association situation determining data CS(tk−1). When it is determined that the current second association flag value and the previous second association flag value are the same, the association situation determining processing proceeds to Step S410. The association situation determining processing proceeds to Step S411 when it is determined that the current second association flag value and the previous second association flag value are different from each other.

In Step S410, the association situation determining unit 36 sets the association situation change flag to "0". The association situation determining processing then proceeds to Step S413. The fact that the association situation change flag is "0" is equivalent to the fact that there is no change in association situation, namely, no change in association flag, between the last association situation determining processing and the current association situation determining processing.

In Step S411, the association situation determining unit 36 sets the association situation change flag to "1". The association situation determining processing then proceeds to Step S413. The fact that the association situation change flag is "1" is equivalent to the fact that there is a change in association situation, namely, a change in association flag, between the last association situation determining processing and the current association situation determining processing.

In Step S412, the association situation determining unit 36 sets the association situation change flag to "1". The association situation determining processing then proceeds to Step S413.

In Step S413, the association situation determining unit 36 outputs the association situation determining data CS(tk) including the first association flag, the second association flag, and the association situation change flag to the tracking processing unit 34. The association situation determining data CS generated in this manner enables the tracking processing unit 34 to which the association situation determining data CS is input to execute tracking switching processing that suits a situation in which the number of sensors associated with the fusion data F is unchanged but there is a change in the type of a sensor associated with the fusion data F.

<Processing Example of the Object Recognition Device 3>

Figure 9:
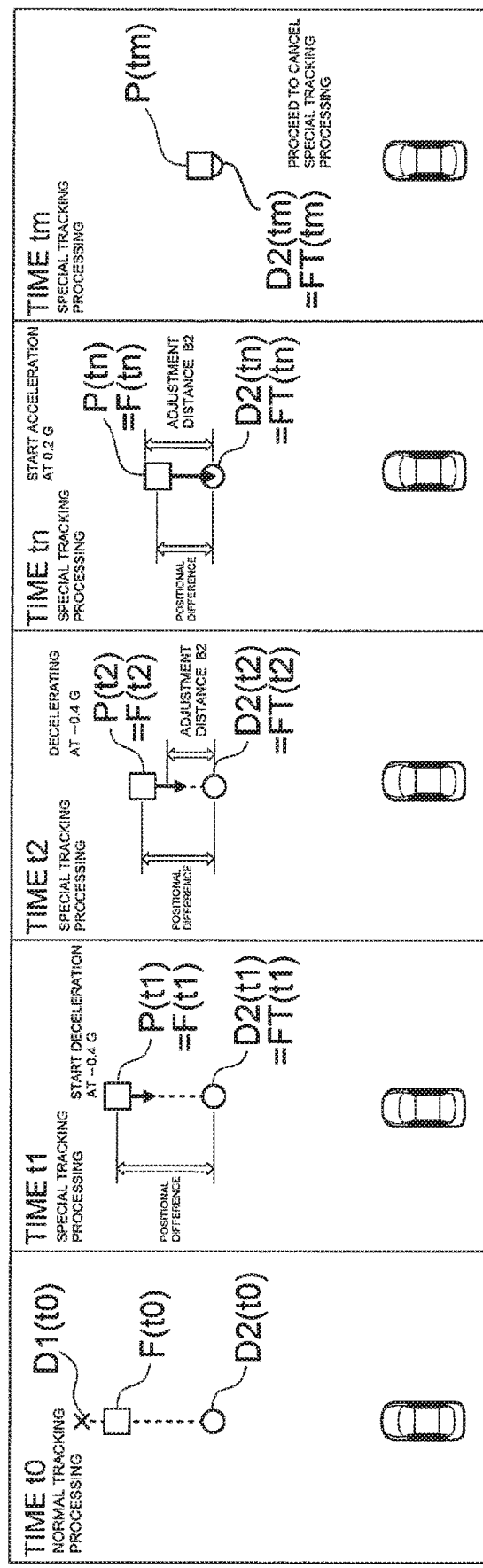
FIG. 9 is an explanatory diagram for illustrating a processing example of the object recognition device according to the first embodiment of the present invention.
Figure 10:
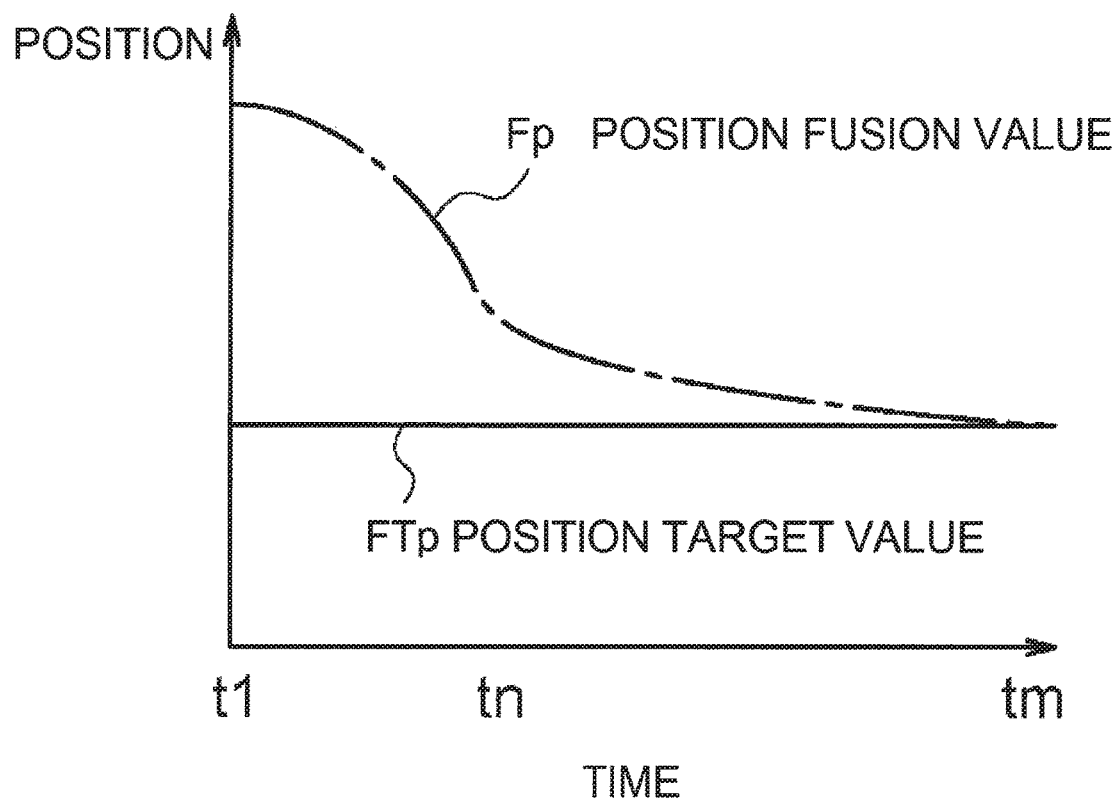
FIG. 10 is a graph for showing changes with time of a position fusion value, which is included in fusion data of FIG. 9, and changes with time of a position target value, which is included among fusion data target values of FIG. 9.

A processing example of the object recognition device 3 is described next with reference to FIG. 9 to FIG. 12. FIG. 9 is an explanatory diagram for illustrating a processing example of the object recognition device 3 according to the first embodiment of the present invention. FIG. 10 is a graph for showing changes with time of the position fusion value Fp, which is included in the fusion data F of FIG. 9, and changes with time of the position target value FTp, which is included among the fusion data target values FT of FIG. 9.

Figure 11:
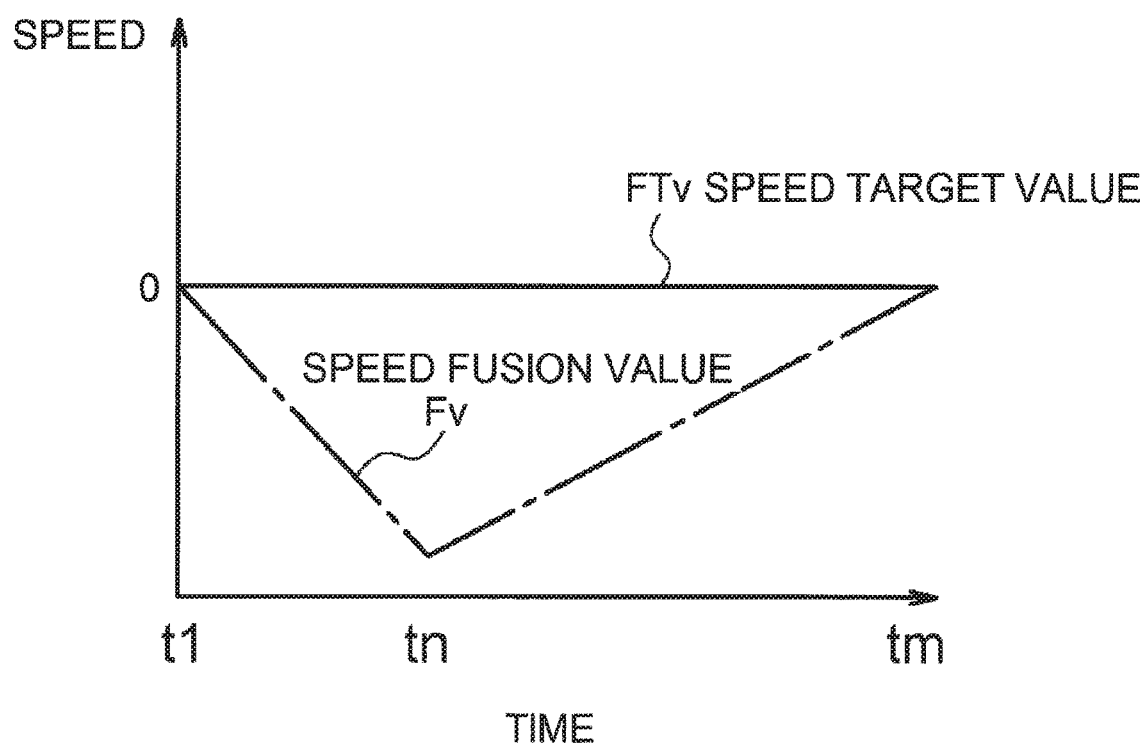
FIG. 11 is a graph for showing changes with time of a speed fusion value, which is included in the fusion data of FIG. 9, and changes with time of a speed target value, which is included among the fusion data target values of FIG. 9.
Figure 12:
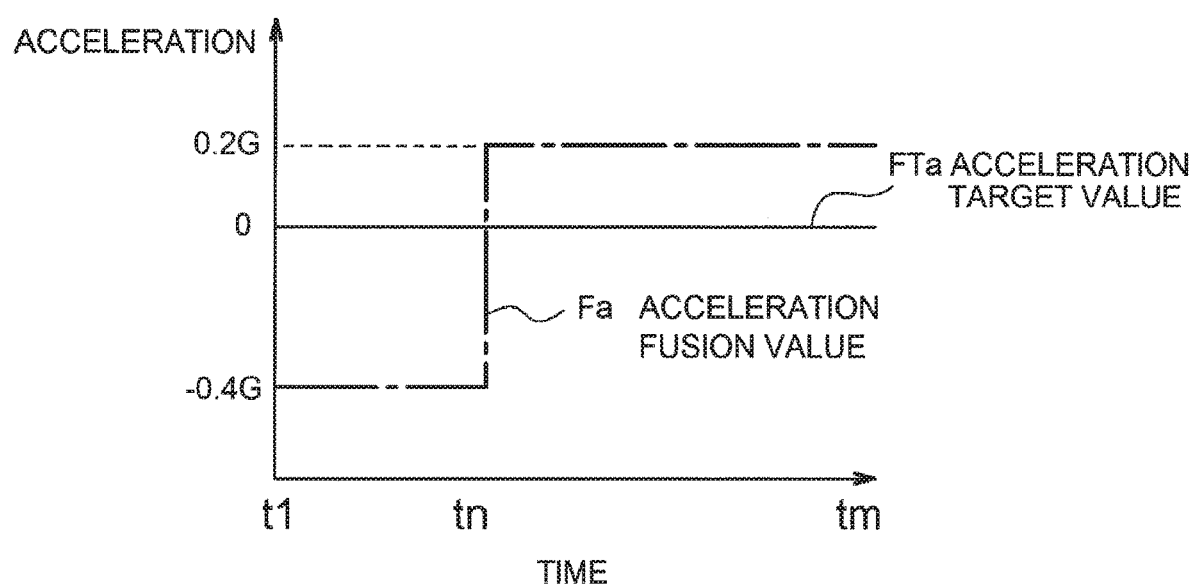
FIG. 12 is a graph for showing changes with time of an acceleration fusion value, which is included in the fusion data of FIG. 9, and changes with time of an acceleration target value, which is included among the fusion data target values of FIG. 9.

FIG. 11 is a graph for showing changes with time of the speed fusion value Fv, which is included in the fusion data F of FIG. 9, and changes with time of the speed target value FTv, which is included among the fusion data target values FT of FIG. 9. FIG. 12 is a graph for showing changes with time of the acceleration fusion value Fa, which is included in the fusion data F of FIG. 9, and changes with time of the acceleration target value FTa, which is included among the fusion data target values FT of FIG. 9.

It is assumed in FIG. 9 that the object and the vehicle both travel forward at the same acceleration and speed. In this case, the relative speed and relative acceleration of the object relative to the vehicle are both 0. It is also assumed in FIG. 9 that the second sensor 2 is associated with the fusion data F, and that the first sensor 1 is lost at a point in time past the time t1. The fusion data target values FT in this case are equivalent to the second observation data D after the time t1.

In FIG. 10 to FIG. 12, the axis of abscissa represents time. The axis of ordinate in FIG. 10, the axis of ordinate in FIG. 11, and the axis of ordinate in FIG. 12 represent the relative position in a longitudinal direction of the object relative to the vehicle, the relative speed in the longitudinal direction of the object relative to the vehicle, and the relative acceleration in the longitudinal direction of the object relative to the vehicle, respectively.

At the time t0, the normal tracking processing is executed with the use of the first observation data D1(t0) obtained from the first sensor 1 and the second observation data D2(t0) obtained from the second sensor 2, and the fusion data F(t0) is obtained as a result.

In the situation described above, the fusion data F(t0) is associated with each of the first sensor 1 and the second sensor 2, and the association situation determining unit 36 accordingly sets the first association flag and the second association flag each to "1". The association situation determining unit 36 sets the association situation change flag to "0". The association situation determining unit 36 gives the tracking processing unit 34 the association situation determining data CS(t0) including the first association flag, the second association flag, and the association situation change flag.

As illustrated in FIG. 9, the prediction processing unit 32 generates the prediction data P(t1) at the time t1 by executing the prediction processing with the use of the fusion data F(t0).

The tracking processing unit 34 executes the tracking switching processing, which is illustrated in FIG. 5 described above. The tracking processing unit 34 obtains the association situation determining data CS(t0) by executing Step S101. The tracking processing unit 34 subsequently executes Step S102, to thereby calculate the fusion data target values FT(t1) based on the second observation data D2(t1).

The tracking processing executed at the previous time t0 is the normal tracking processing. The association situation change flag included in the association situation determining data CS(t0) has a value "0". However, the number of sensors associated with the fusion data F at the time t1 has decreased from "2" to "1". The tracking switching processing in this case proceeds from Step S103 to Step S107 and Step S108 in the stated order.

The tracking processing unit 34 subsequently executes Step S108 with the use of a positional difference calculated from the fusion data target values FT(t1) and the prediction data P(t1). The positional difference here is larger than the second set threshold value. It is determined in this case that the fusion data discontinuity state is happening, and the tracking switching processing accordingly proceeds from Step S108 to Step S109. The tracking processing unit 34 starts the specialized tracking processing, which is illustrated in FIG. 6 described above, by executing Step S109.

The tracking processing unit 34 executes the specialized tracking processing of FIG. 6. The tracking processing unit 34 uses the fusion data target values FT(t1) and the prediction data P(t1) to execute Step S201. As can be seen in FIG. 10, the position target value FTp(t1) here is equal to or smaller than the position prediction value Pp(t1). The specialized tracking processing in this case proceeds from Step S201 to Step S203. The tracking processing unit 34 sets the adjustment acceleration to "acceleration A2" by executing Step S203. In this case, the acceleration A2 has a value "−0.4 G".

The tracking processing unit 34 subsequently executes Step S204 with the use of the fusion data target values FT(t1) and the prediction data P(t1). As can be seen in FIG. 11, the speed target value FTv(t1) here is equal to or smaller than the speed prediction value Pv(t1). The specialized tracking processing in this case proceeds from Step S204 to Step S206. The tracking processing unit 34 calculates the adjustment distance B2 by executing Step S206.

The tracking processing unit 34 subsequently executes Step S207, which is the same as Step S201. The specialized tracking processing in this case proceeds from Step S207 to Step S211. The tracking processing unit 34 executes Step S211 with the use of a positional difference that is calculated from the position prediction value Pp(t1) and the position target value FTp(t1), and with the use of the adjustment distance B2. The positional difference here is larger than the adjustment distance B2. The specialized tracking processing in this case proceeds from Step S211 to Step S212.

The tracking processing unit 34 subsequently executes Step S212, to thereby maintain the set adjustment acceleration, namely, the acceleration A2. The tracking processing unit 34 outputs the prediction data P(t1) as the tracking data T(t1).

The fusion result output unit 35 executes the fusion result update processing, which is illustrated in FIG. 7 described above. The tracking data T(t1) is data obtained by executing the specialized tracking processing by the tracking processing unit 34. The fusion result update processing accordingly proceeds from Step S301 to Step S303.

The fusion result output unit 35 subsequently changes the acceleration prediction value Pa(t1) included in the prediction data P(t1) that is equivalent to the tracking data T(t1) obtained by executing the specialized tracking processing, to the acceleration "−0.4 G" mentioned above. The fusion result output unit 35 outputs this changed prediction data P(t1) as the fusion data F(t1).

The association situation determining unit 36 executes the association situation determining processing, which is illustrated in FIG. 8 described above. The association situation determining unit 36 obtains the association situation determining data CS(t0) by executing Step S401. The association situation determining unit 36 sets the first association flag to "0", and sets the second association flag to "1".

The first association flag and the second association flag that are included in the association situation determining data CS(t0) are each "1". The association situation determining unit 36 accordingly sets the association situation change flag to "1". The association situation determining unit 36 gives the association situation determining data CS(t1) to the tracking processing unit 34.

As illustrated in FIG. 9, the prediction processing unit 32 generates the prediction data P(t2) at the time t2 with the use of the previous fusion data F(t1) and the adjustment acceleration set in the last specialized tracking processing, that is, "−0.4 G", through uniformly accelerated motion of the fusion data F(t1) that lasts from the time t1 to the time t2.

The tracking processing unit 34 executes the tracking switching processing, which is illustrated in FIG. 5 described above. The tracking processing executed at the previous time t1 is the specialized tracking processing. The tracking switching processing accordingly proceeds from Step S101 to Step S102, Step S103, and Step S104 in the stated order.

The tracking processing unit 34 subsequently executes Step S104 with the use of a positional difference that is calculated from the fusion data target values FT(t2) and the prediction data P(t2). The positional difference here is larger than the first set threshold value. It is determined in this case that the fusion data discontinuity state is happening, and the tracking switching processing accordingly proceeds from Step S104 to Step S106. The tracking processing unit 34 continues the specialized tracking processing by executing Step S106.

The tracking processing unit 34 executes the specialized tracking processing, which is illustrated in FIG. 6 described above. The tracking processing unit 34 uses the fusion data target values FT(t2) and the prediction data P(t2) to execute Step S201. As can be seen in FIG. 10, the position target value FTp(t2) here is equal to or smaller than the position prediction value Pp(t2). As can be seen in FIG. 11, the speed target value FTv(t2) here is equal to or smaller than the speed prediction value Pv(t2).

The specialized tracking processing in this case proceeds from Step S201 to Step S203, Step S204, Step S206, Step S207, and Step S211 in the stated order. The tracking processing unit 34 thus sets the adjustment acceleration to "acceleration A2", and calculates the adjustment distance B2.

The tracking processing unit 34 subsequently executes Step S211 with the use of a positional difference that is calculated from the position prediction value Pp(t2) and the position target value FTp(t2), and with the use of the adjustment distance B2. The positional difference here is larger than the adjustment distance B2. The specialized tracking processing in this case proceeds from Step S211 to Step S212.

The tracking processing unit 34 subsequently executes Step S212 as at the time t1, to thereby maintain "−0.4 G" as the adjustment acceleration. The tracking processing unit 34 outputs the prediction data P(t2) as the tracking data T(t2).

The fusion result output unit 35 executes the fusion result update processing, which is illustrated in FIG. 7 described above. The tracking data T(t2) is data obtained by executing the specialized tracking processing by the tracking processing unit 34. The fusion result update processing accordingly proceeds from Step S301 to Step S303.

The fusion result output unit 35 subsequently sets the acceleration prediction value Pa(t2) included in the prediction data P(t2) that is equivalent to the tracking data T(t2) obtained by executing the specialized tracking processing, to the acceleration "−0.4 G" mentioned above. The fusion result output unit 35 outputs this prediction data P(t2) as the fusion data F(t2).

The association situation determining unit 36 executes the association situation determining processing, which is illustrated in FIG. 8 described above. As is understood from FIG. 9, the association situation determining unit 36 sets the first association flag to "0", and sets the second association flag to "1".

The first association flag and the second association flag that are included in the association situation determining data CS(t1) are "0" and "1", respectively. The association situation determining unit 36 accordingly sets the association situation change flag to "0". The association situation determining unit 36 gives the association situation determining data CS(t2) to the tracking processing unit 34.

In a period past the time t2 to a time tn, the object recognition device 3 executes the same processing as the processing executed at the time t2. The repeated execution of the specialized tracking processing in this period causes the fusion data F to undergo time transition as shown in FIG. 10 to FIG. 12, in line with uniformly accelerated motion, with the adjustment acceleration set to "−0.4 G". This closes the gap of the position fusion value Fp from the position target value FTp.

As illustrated in FIG. 9, the prediction processing unit 32 generates the prediction data P(tn) at the time tn with the use of the previous fusion data F(tn−1) and with the use of the adjustment acceleration set in the last specialized tracking processing, that is, "−0.4 G", through uniformly accelerated motion that lasts from a time tn−1 to the time tn.

The tracking processing unit 34 executes the tracking switching processing, which is illustrated in FIG. 5 described above. The tracking processing executed at the previous time tn−1 is the specialized tracking processing. The tracking switching processing accordingly proceeds from Step S101 to Step S102, Step S103, and Step S104 in the stated order.

The tracking processing unit 34 subsequently executes Step S104 with the use of a positional difference that is calculated from the fusion data target values FT(tn) and the prediction data P(tn). The positional difference here is larger than the first set threshold value. It is determined in this case that the fusion data discontinuity state is happening, and the tracking switching processing accordingly proceeds from Step S104 to Step S106. The tracking processing unit 34 continues the specialized tracking processing by executing Step S106.

The tracking processing unit 34 executes the specialized tracking processing, which is illustrated in FIG. 6 described above. The tracking processing unit 34 uses the fusion data target values FT(tn) and the prediction data P(tn) to execute Step S201. As can be seen in FIG. 10, the position target value FTp(tn) here is equal to or smaller than the position prediction value Pp(tn). As can be seen in FIG. 11, the speed target value FTv(tn) here is equal to or smaller than the speed prediction value Pv(tn).

The specialized tracking processing in this case proceeds from Step S201 to Step S203, Step S204, Step S206, Step S207, and Step S211 in the stated order. The tracking processing unit 34 thus sets the adjustment acceleration to "acceleration A2", and calculates the adjustment distance B2.

The tracking processing unit 34 subsequently executes Step S211 with the use of a positional difference that is calculated from the position prediction value Pp(tn) and the position target value FTp(tn), and with the use of the adjustment distance B2. As illustrated in FIG. 9, the positional difference here is smaller than the adjustment distance B2. The specialized tracking processing in this case proceeds from Step S211 to Step S213.

The tracking processing unit 34 subsequently executes Step S213, to thereby reset the adjustment acceleration that has been set in Step S203, by changing the adjustment acceleration from "acceleration A2" to "acceleration A1". The acceleration A1 here has a value "0.2 G". The tracking processing unit 34 outputs the prediction data P(tn) as the tracking data T(tn).

The fusion result output unit 35 executes the fusion result update processing, which is illustrated in FIG. 7 described above. The tracking data T(tn) is data obtained by executing the specialized tracking processing by the tracking processing unit 34. The fusion result update processing accordingly proceeds from Step S301 to Step S303.

The fusion result output unit 35 subsequently changes the acceleration prediction value Pa(tn) included in the prediction data P(tn) that is equivalent to the tracking data T(tn) obtained by executing the specialized tracking processing, to the acceleration "0.2 G" mentioned above. The fusion result output unit 35 outputs this changed prediction data P(tn) as the fusion data F(tn).

The association situation determining unit 36 executes the association situation determining processing, which is illustrated in FIG. 8 described above. As can be seen from FIG. 9, the association situation determining unit 36 sets the first association flag to "0", and sets the second association flag to "1".

The first association flag and the second association flag that are included in the association situation determining data CS(tn−1) are "0" and "1", respectively. The association situation determining unit 36 accordingly sets the association situation change flag to "0". The association situation determining unit 36 gives the association situation determining data CS(tn) to the tracking processing unit 34.

In a period past the time tn to a time tm, the object recognition device 3 executes the same processing as the processing executed at the time tn. The repeated execution of the specialized tracking processing described above in this period causes the fusion data F to undergo time transition as shown in FIG. 10 to FIG. 12, in line with uniformly accelerated motion, with the adjustment acceleration set to "0.2 G". This closes the gap of the position fusion value Fp from the position target value FTp, and the gap of the speed fusion value Fv from the speed target value FTv as well.

As illustrated in FIG. 9, the prediction processing unit 32 generates the prediction data P(tm) at the time tm with the use of the previous fusion data F(tm−1) and the adjustment acceleration set in the last specialized tracking processing, that is, "0.2 G", through uniformly accelerated motion of the fusion data F(tm−1) that lasts from the time tm−1 to the time tm.

The tracking processing unit 34 executes the tracking switching processing, which is illustrated in FIG. 5 described above. The tracking processing executed at the previous time tm−1 is the specialized tracking processing. The tracking switching processing accordingly proceeds from Step S101 to Step S102, Step S103, and Step S104 in the stated order.

The tracking processing unit 34 subsequently executes Step S104 with the use of a positional difference that is calculated from the fusion data target values FT(tm) and the prediction data P(tm). The positional difference here is smaller than the first set threshold value. It is determined in this case that the fusion data discontinuity state is not happening, and the tracking switching processing accordingly proceeds from Step S104 to Step S105. The tracking processing unit 34 cancels the specialized tracking processing by executing Step S105.

The tracking processing unit 34 generates the tracking data T(tm) by executing the normal tracking processing with the use of the fusion data target values FT(tm), namely, the second observation data D2(tm), and the prediction data P(tm).

Next, the fusion result output unit 35 executes the fusion result update processing, which is illustrated in FIG. 7 described above. The tracking data T(tm) is data obtained by executing the normal tracking processing by the tracking processing unit 34. The fusion result update processing accordingly proceeds from Step S301 to Step S302.

The fusion result output unit 35 subsequently outputs the tracking data T(tm) obtained in the normal tracking processing as the fusion data F(tm).

As described above, according to the first embodiment, the object recognition device 3 is configured to execute the specialized tracking processing when the fusion data discontinuity state is happening, and generate the tracking data T that is equivalent to the prediction data P in the specialized tracking processing by setting an adjustment physical quantity for solving the fusion data discontinuity state. More specifically, the object recognition device 3 is configured to replace a predicted value of a specific physical quantity included in the prediction data P that is equivalent to the tracking data T with the adjustment physical quantity to be set, and output the post-replacement prediction data P as the current value of the fusion data F. This prevents the state in which a change of the fusion data from the previous value to the current value exceeds the tolerable range.

Each of the functions of the object recognition device 3 in the first embodiment described above is implemented by a processing circuit. The processing circuit for implementing each of the functions may be dedicated hardware, or a processor configured to execute a program stored in a memory.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof. The functions of the data reception unit 31, the prediction processing unit 32, the association processing unit 33, the tracking processing unit 34, the fusion result output unit 35, and the association situation determining unit 36 may each be implemented by an individual processing circuit, or may be implemented together by one processing circuit.

Meanwhile, when the processing circuit is a processor, the function of each of the data reception unit 31, the prediction processing unit 32, the association processing unit 33, the tracking processing unit 34, the fusion result output unit 35, and the association situation determining unit 36 is implemented by software, firmware, or a combination of software and firmware. The software and the firmware are coded as a program and stored in a memory. The processor reads and executes the program stored in the memory, to thereby implement the function of each of the units. This means that the object recognition device 3 includes a memory for storing a program that consequently causes a data reception step, a prediction processing step, a association processing step, a tracking processing step, a fusion result output step, and a association situation determining step to be executed.

It is also understood that those programs cause a computer to execute procedures and methods for the respective units. In this case, the memory corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory also corresponds to, for example, a magnetic disk, a flexible disk, an optical disc, a compact disc, a MiniDisk, or a DVD.

Some of the respective functions of the respective units described above may be implemented by dedicated hardware, and other thereof may be implemented by software or firmware.

In this manner, the processing circuit can implement the function of each of the units described above by hardware, software, firmware, or a combination thereof.

What is claimed is:

1. An object recognition device, which is configured to generate fusion data from observation data that is received from each of a plurality of sensors to output the fusion data, each of the plurality of sensors being configured to detect, as the observation data, a physical quantity that indicates a state of an object present in a detectable range, the object recognition device comprising:
    a data receiver configured to receive the observation data from each of the plurality of sensors;
    a prediction processor configured to generate prediction data that is a result of predicting a current value of the fusion data by using a previous value of the fusion data and in accordance with a specific movement model to output the prediction data; and
    a tracking processor configured to execute specialized tracking processing when a change of the fusion data from the previous value to the current value exceeds a tolerable range,
    the tracking processor being configured to generate, in the specialized tracking processing, tracking data that is equivalent to the prediction data by setting an adjustment physical quantity for solving a state in which a change of the fusion data from the previous value to the current value exceeds the tolerable range.

2. The object recognition device according to claim 1, further comprising a fusion result output processor configured to output the current value of the fusion data,
    wherein the fusion result output processor is configured to replace a predicted value of a specific physical quantity included in the prediction data that is equivalent to the tracking data output from the tracking processor with the adjustment physical quantity set by the tracking processor, and output the prediction data processed by the replacement as the current value of the fusion data.

3. The object recognition device according to claim 2, wherein the specific movement model is a uniformly accelerated motion model, and
    wherein each of the adjustment physical quantity and the specific physical quantity is acceleration.

4. The object recognition device according to claim 1, wherein the tracking processor is configured to perform discontinuity determination for determining whether the state in which a change of the fusion data from the previous value to the current value exceeds the tolerable range is happening, and switch tracking processing to be executed between normal tracking processing and the specialized tracking processing based on a result of the discontinuity determination, and
    wherein the tracking processor is configured to generate tracking data in the normal tracking processing through an update of the previous value of the tracking data by using the prediction data output from the prediction processor and the observation data associated with the prediction data to output the generated tracking data.

5. The object recognition device according to claim 4, wherein the tracking processor is configured to determine in the discontinuity determination whether the state in which a change of the fusion data from the previous value to the current value exceeds the tolerable range is happening, based on a positional difference between a fusion data target value, which is calculated from the observation data received from each of the plurality of sensors, and the prediction data, which is output from the prediction processor.

6. The object recognition device according to claim 4, wherein the tracking processor is configured to perform the discontinuity determination when a number of sensors associated with the fusion data is changed.

7. The object recognition device according to claim 4, wherein the tracking processor is configured to continue the specialized tracking processing when it is determined as a result of the discontinuity determination after a switch from the normal tracking processing to the specialized tracking processing that the state in which a change of the fusion data from the previous value to the current value exceeds the tolerable range is happening.

8. The object recognition device according to claim 4, wherein the tracking processor is configured to make a switch from the specialized tracking processing to the normal tracking processing when it is determined as a result of the discontinuity determination after a switch from the normal tracking processing to the specialized tracking processing that the state in which a change of the fusion data from the previous value to the current value exceeds the tolerable range is not happening.

9. The object recognition device according to claim 4, wherein the tracking processor is configured to execute prevention processing for preventing the state in which a change of the fusion data from the previous value to the current value exceeds the tolerable range from occurring, when a switch from the specialized tracking processing to the normal tracking processing is made.

10. The object recognition device according to claim 9, wherein, as the prevention processing, the tracking processor saves an error covariance matrix that has been used in the normal tracking processing when a switch from the normal tracking processing to the specialized tracking processing is made, and uses the saved error covariance matrix to execute the normal tracking processing when a switch from the specialized tracking processing to the normal tracking processing is made.

11. An object recognition method for generating fusion data from observation data that is received from each of a plurality of sensors and output the fusion data, each of the plurality of sensors being configured to detect, as the observation data, a physical quantity that indicates a state of an object present in a detectable range, the object recognition method comprising:
   receiving the observation data from each of the plurality of sensors;
   generating prediction data that is a result of predicting a current value of the fusion data by using a previous value of the fusion data and in accordance with a specific movement model to output the prediction data; and
   executing specialized tracking processing when a change of the fusion data from the previous value to the current value exceeds a tolerable range,
   the executing specialized tracking processing including generating, in the specialized tracking processing, tracking data that is equivalent to the prediction data by setting an adjustment physical quantity for solving a state in which a change of the fusion data from the previous value to the current value exceeds the tolerable range.

* * * * *